United States Patent
Lee et al.

(10) Patent No.: US 9,892,500 B2
(45) Date of Patent: Feb. 13, 2018

(54) METHOD FOR GROUPING REGION OF INTEREST OF MASK PATTERN AND MEASURING CRITICAL DIMENSION OF MASK PATTERN USING THE SAME

(71) Applicant: SAMSUNG ELECTRONICS CO., LTD., Suwon-si, Gyeonggi-do (KR)

(72) Inventors: Hyung-Joo Lee, Suwon-si (KR); Won-Joo Park, Hwaseong-si (KR); Seuk-Hwan Choi, Suwon-si (KR); Byung-Gook Kim, Seoul (KR); Dong-Hoon Chung, Yongin-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 348 days.

(21) Appl. No.: 14/710,872

(22) Filed: May 13, 2015

(65) Prior Publication Data
US 2016/0077517 A1 Mar. 17, 2016

(30) Foreign Application Priority Data
Sep. 11, 2014 (KR) .......................... 10-2014-0120345

(51) Int. Cl.
*G06F 19/00* (2011.01)
*G05B 13/02* (2006.01)
*G06T 7/00* (2017.01)

(52) U.S. Cl.
CPC .. *G06T 7/0004* (2013.01); *G05B 2219/45027* (2013.01); *G06T 2207/10061* (2013.01); *G06T 2207/30148* (2013.01)

(58) Field of Classification Search
CPC ...................................................... G06Q 10/06
(Continued)

(56) References Cited

U.S. PATENT DOCUMENTS 6,510,730 B1 * 1/2003 Phan ........................ G03F 1/36
430/30
7,247,574 B2 * 7/2007 Broeke ............... G03F 7/70441
257/E21.023
(Continued)

FOREIGN PATENT DOCUMENTS

JP    2008-235575 A    10/2008
JP    2011-169835 A    9/2011
(Continued)

OTHER PUBLICATIONS

Kang et al, Critical dimension control in photolithography based on the yield by a simulation program, Sep. 9, 2005, paes 7.*

*Primary Examiner* — Suresh Suryawanshi
(74) *Attorney, Agent, or Firm* — Lee & Morse, P.C.

(57) ABSTRACT

A method for measuring a critical dimension of a mask pattern, including generating a mask pattern using an optically proximity-corrected (OPC) mask design including at least one block; measuring a first critical dimension of a target-region of interest (target-ROI) including neighboring blocks having a same critical dimension (CD), in the mask pattern; determining a group region of interest including the target-ROI and at least one neighboring block adjacent to the target-ROI; measuring second CDs of the neighboring blocks of the group region of interest; and correcting a measuring value of the first CD using a measuring value of the second CDs.

15 Claims, 29 Drawing Sheets

(58) Field of Classification Search
USPC .......................................................... 700/97
See application file for complete search history.

(56) References Cited

U.S. PATENT DOCUMENTS

| | | | |
|---|---|---|---|
| 7,519,942 B2 | 4/2009 | Ataka et al. | |
| 7,550,235 B2* | 6/2009 | Shi ........................... | G03F 7/705 382/144 |
| 7,803,506 B2* | 9/2010 | Bang ...................... | G01B 11/24 356/636 |
| 8,056,032 B2 | 11/2011 | Lee et al. | |
| 8,114,557 B2* | 2/2012 | Kim .......................... | G03F 1/36 430/5 |
| 8,283,093 B2* | 10/2012 | Hsieh ....................... | G03F 1/36 430/5 |
| 8,507,858 B2 | 8/2013 | Fuyaka et al. | |
| 8,677,288 B2* | 3/2014 | Vengertsev ............... | G03F 1/36 716/50 |
| 8,831,333 B2* | 9/2014 | Fu ............................. | G03F 1/36 382/144 |
| 8,988,521 B2* | 3/2015 | Yoon ........................ | G06T 7/60 348/80 |
| 2002/0138810 A1* | 9/2002 | Lavin ........................ | G03F 1/36 716/53 |
| 2005/0123845 A1* | 6/2005 | Huh .................... | G03F 7/70433 430/30 |
| 2009/0024978 A1* | 1/2009 | Kim .......................... | G03F 1/36 716/53 |
| 2012/0105617 A1 | 5/2012 | Yoon et al. | |
| 2014/0236516 A1* | 8/2014 | Pforr ......................... | G03F 1/84 702/84 |

FOREIGN PATENT DOCUMENTS

| | | |
|---|---|---|
| JP | 2014-025700 A | 2/2013 |
| JP | 2013-068519 A | 4/2013 |
| KR | 10-2008-0069326 A | 7/2008 |

* cited by examiner

METHOD FOR GROUPING REGION OF INTEREST OF MASK PATTERN AND MEASURING CRITICAL DIMENSION OF MASK PATTERN USING THE SAME

CROSS-REFERENCE TO RELATED APPLICATION

Korean Patent Application No. 10-2014-0120345, filed on Sep. 11, 2014, in the Korean Intellectual Property Office, and entitled: "Method for Grouping Region of Interest of Mask Pattern and Measuring Critical Dimension of Mask Pattern Using the Same," is incorporated by reference herein in its entirety.

BACKGROUND

1. Field

Provided is a method for grouping a region of interest (ROI) of a mask pattern and a method for measuring a critical dimension (CD) of the mask pattern.

2. Description of the Related Art

Measurement of a critical dimension (CD) of a mask pattern used in manufacturing a semiconductor device may be an important part of the manufacturing process of the semiconductor device. In the measurement of the CD of the mask pattern, as the pattern is refined with integration and small-sizing of the semiconductor device and the mask pattern is optically proximity-corrected (OPC), it may become more difficult to ensure reliability.

SUMMARY

Embodiments may be realized by providing a method for measuring a critical dimension of a mask pattern, including generating a mask pattern using an optically proximity-corrected (OPC) mask design including at least one block; measuring a first critical dimension of a target-region of interest (target-ROI) including neighboring blocks having a same critical dimension (CD), in the mask pattern; determining a group region of interest including the target-ROI and at least one neighboring block adjacent to the target-ROI; measuring second CDs of the neighboring blocks of the group region of interest; and correcting a measuring value of the first CD using a measuring value of the second CDs.

Generating the mask pattern may include generating a first mask design; generating a second mask design by optically proximity-correcting the first mask design; and generating the mask pattern according to the second mask pattern.

Determining the group region of interest may include overlaying the first mask design with the second mask design; defining a reference region of interest of the first mask design; and determining a region of the mask pattern corresponding to the reference region of interest as the group region of interest.

Defining the reference region of interest may include defining a second region extended from a first region corresponding to the target-ROI in the first mask design and having a same CD as the first region.

The method may further include simulating forming a target pattern using the mask pattern. Determining the group region of interest may include overlaying a simulation result image with the mask design, defining a reference region of interest of the simulation result image, and determining a region of the mask pattern design corresponding to the reference region of interest as the group region of interest.

Defining the reference region of interest of the simulation result image may include finding a third region corresponding to the target-ROI in the simulation result image; finding a fourth region extended from the third region and having a same CD as the third region; and defining the fourth region as the reference region of interest.

Finding the fourth region may include finding critical points in which CDs vary in the third region; and defining a region connecting the critical points as the fourth region.

The critical points may be detected using one or more of contrast of a pixel, edge detection, or a slope of an edge.

The method may further include acquiring a measuring image of a target pattern by forming the target pattern using the mask pattern. Determining the group region of interest may include overlaying the measuring image of the target pattern with the mask design; defining a reference region of interest of the measuring image; and determining a region of the mask pattern design corresponding to the reference region of interest as the group region of interest.

The measuring image may include a scanning electron microscope (SEM) image.

Determining the group region of interest may include measuring second CDs of the neighboring blocks adjacent to the target-ROI; and determining the target-ROI and the neighboring block adjacent to the target-ROI, in which a difference between the first CD and each second CD is not larger than a predetermined critical design gap, as the group region of interest.

Correcting the measuring value of the first CD may include calculating a first mean to target between the measuring value of the first CD and the first CD in the mask design; calculating second mean to targets between the measuring values of the second CDs of the neighboring blocks of the group region of interest and the second CD of the mask design for each block, respectively; and correcting the measuring value of the first CD by normalizing the first mean to target and the second mean to target.

Embodiments may be realized by providing a method for grouping a region of interest of a mask pattern, including setting a target region of interest including neighboring blocks having a same critical dimension (CD), in a mask pattern using an optically proximity-corrected (OPC) mask design; and determining a group region of interest including the target region of interest and at least one neighboring block adjacent to the target region of interest.

Determining the group region of interest may include determining the group region of interest by overlaying at least one of a mask design before the optical proximity correction of the mask pattern, a mask-patterning simulation result image, and the measuring image of the target pattern with the optically proximity-corrected mask design of the mask pattern.

Determining the group region of interest may include measuring second CDs of the neighboring blocks adjacent to the target-ROI; and determining the target region of interest and the neighboring block adjacent to the target-ROI, in which a difference between the first CD and each second CD is not larger than a predetermined critical design gap, as the group region of interest.

Embodiments may be realized by providing a method of fabricating a final mask pattern used in manufacturing a semiconductor device, including measuring a critical dimension of a mask pattern, including finding a candidate region of interest having a first critical dimension in a field of view (FOV) of a measuring device, determining a candidate group region of interest including a mask design before optical proximity correction of the mask pattern, and finding a target group region of interest including a target region of interest by excluding candidate regions of interest having lengths beyond a predetermined region of interest length range; altering a layout of the mask pattern according to the critical dimension of the mask pattern to provide an altered layout; and fabricating the mask according to the altered layout.

The mask pattern may include an optically proximity-corrected mask pattern.

Finding the target region of interest may include finding the candidate group region of interest, which is most similar to the predetermined region of interest length, as the target region of interest.

The method may further include measuring a first critical dimension (CD) of the target region of interest, including measuring second CDs of neighboring blocks in the target region of interest; and correcting a measuring value of the first CD using measuring values of the second CDs.

Correcting the measuring value of the first CD may include calculating a first mean to target between the measuring value of the first CD and the first CD in the mask design; calculating a second mean to target between the measuring values of the second CDs of the neighboring blocks of the target region of interest and the second CD of the mask design for each block, respectively; and correcting the measuring value of the first CD by normalizing the first mean to target and the second mean to target. Normalizing the first mean to target and the second mean to target may include calculating an average value of the first mean to target and the second mean to target and calculating a correcting value of the first CD by adding the average value to the first CD in the mask design.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
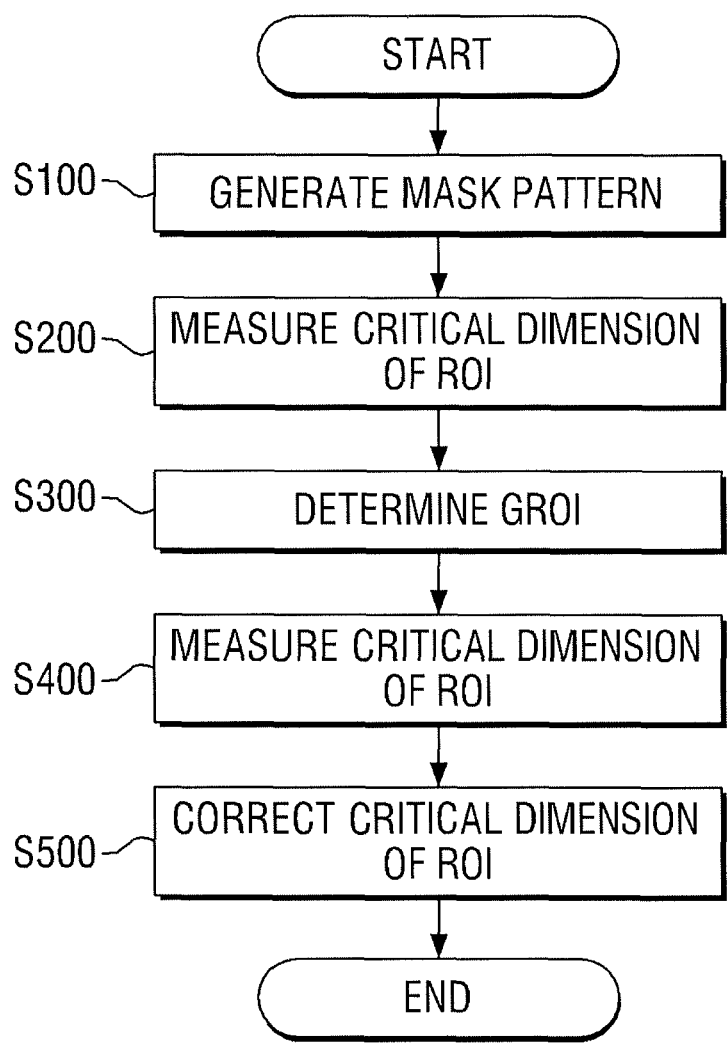
FIG. 1 illustrates a flowchart for describing a method for measuring a critical dimension of a mask pattern according to a first embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include mean to targets in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a method for measuring a critical dimension of a mask pattern according to a first embodiment will be described with reference to FIGS. 1 to 14.

FIG. 1 illustrates a flowchart for describing a method for measuring a critical dimension of a mask pattern according to a first embodiment.

Referring to FIG. 1, first, a mask pattern may be generated (S100).

The mask pattern refers to a mask for forming a target pattern formed on a substrate. The target pattern on the substrate may be formed through a lithography process and an etching process. A mask for patterning the target pattern to be engraved or embossed may be required. In the mask, when the target pattern is embossed, a mask pattern having the same shape as the target pattern may be required, and when the target pattern is engraved, a mask pattern having an opposite shape to the target pattern may be required. Hereinafter, for simple description, it is assumed that the target pattern is embossed.

Figure 2:
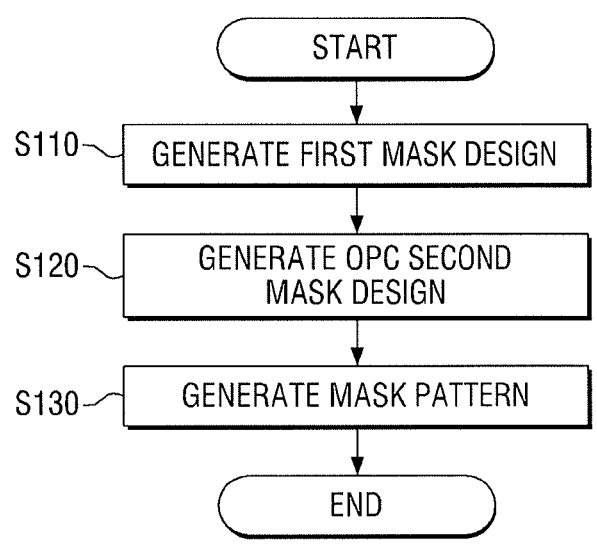
FIG. 2 illustrates a flowchart for describing an operation of generating the mask pattern of FIG. 1 in detail.
Figure 3:
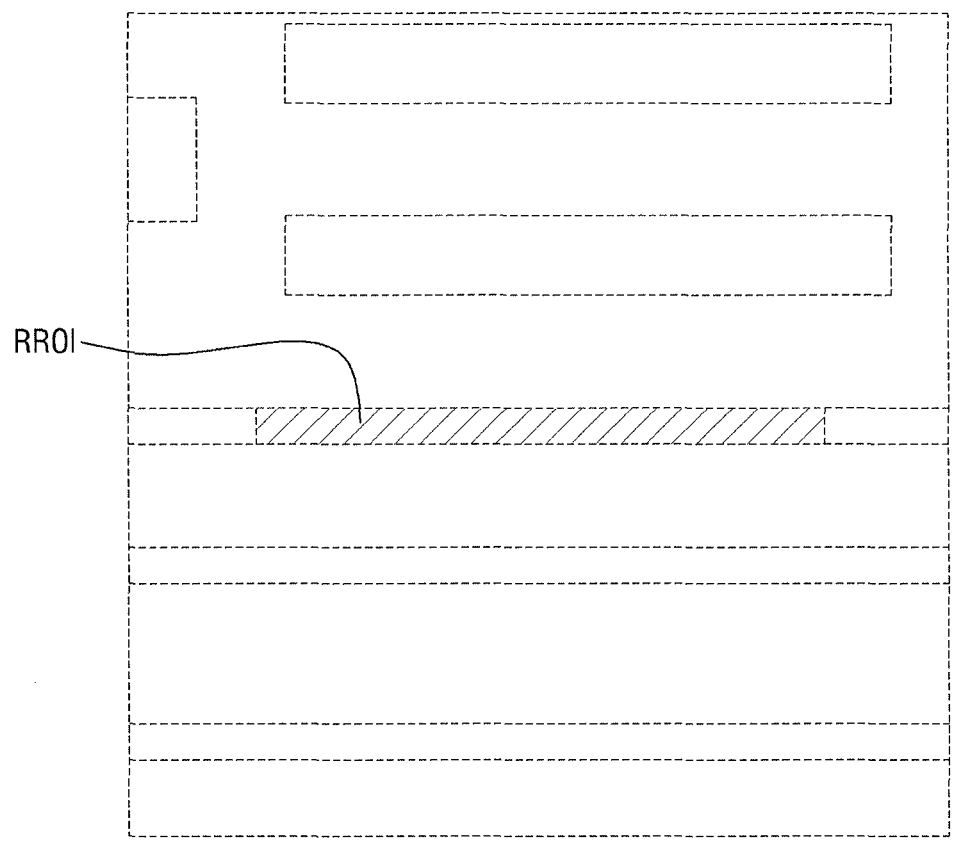
FIG. 3 illustrates a design of a mask pattern before optical proximity correction for describing the method for measuring the critical dimension of the mask pattern according to the first embodiment.
Figure 4:
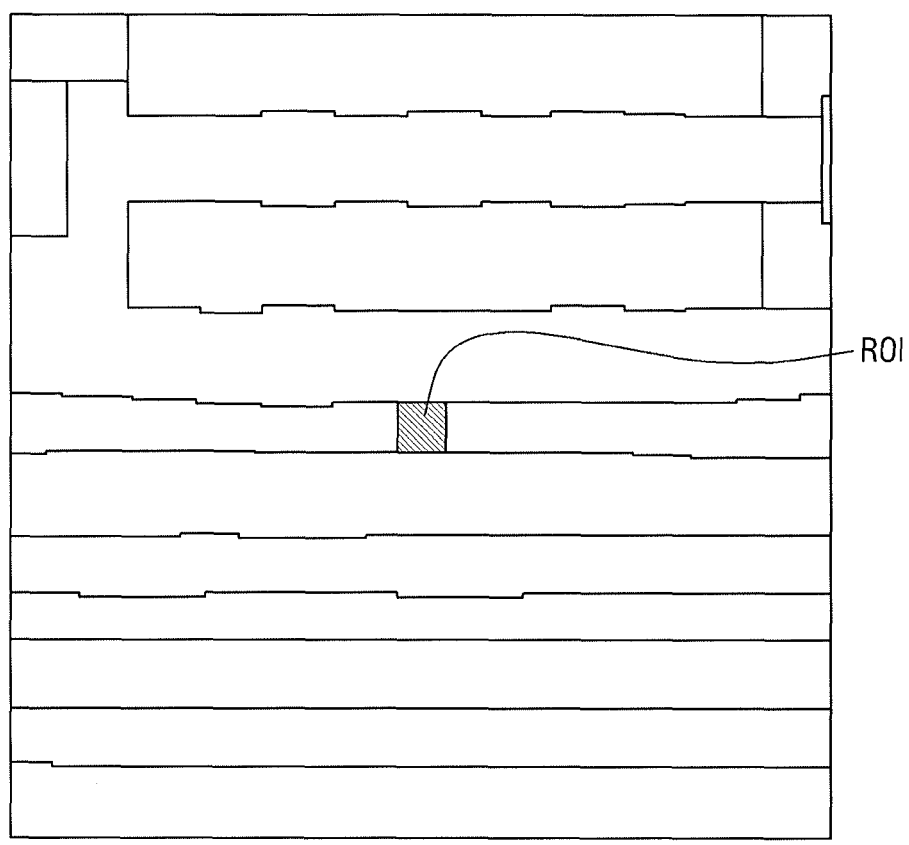
FIG. 4 illustrates a design of a mask pattern after optical proximity correction for describing the method for measuring the critical dimension of the mask pattern according to the first embodiment.

FIG. 2 illustrates a flowchart for describing an operation of generating the mask pattern of FIG. 1 in detail, and FIG. 3 illustrates a design of a mask pattern before optical proximity correction for describing the method for measuring the critical dimension of the mask pattern according to the first embodiment. FIG. 4 illustrates a design of a mask pattern after optical proximity correction for describing the method for measuring the critical dimension of the mask pattern according to the first embodiment.

Referring to FIG. 2, first, a first mask design may be generated (S110).

The first mask design refers to an initial design of the mask pattern for forming a target pattern. Since it is assumed that the target pattern is embossed, the mask pattern may be designed in the same shape as the target pattern.

Referring to FIG. 3, the first mask design may be formed the same as the shape of the target pattern. A reference region of interest (RROI) corresponding to a region of interest (ROI), which is a point to be measured later on, may exist. The RROI will be described below.

Referring back to FIG. 2, a second mask design in which optical proximity correction is performed may be generated (S120).

Referring to FIG. 4, the second mask design may be generated by optical proximity correcting (OPC) the first mask design. In the second mask design, a box-shaped curve may be added as compared with the first mask pattern. The second mask design may include a region of interest (ROI), which is a point to be measured later on.

The region of interest (ROI) refers to a region for measuring a critical dimension (CD). The critical dimension (CD) refers to a width of the pattern of FIG. 4. Since the pattern with the ROI of FIG. 4 is extended, e.g., extends, in a horizontal direction, the CD of the pattern refers to a width in a vertical direction.

The region of interest (ROI) refers to a portion having no difference in CD from the neighboring block on the design, and in the case of the second mask design, which is optically proximity-corrected, a length in a vertical direction to the CD in the ROI may be smaller than that of the first mask design.

Hereinafter, the optical proximity correction will be described in detail with reference to FIGS. 5 to 7.

Figure 5:
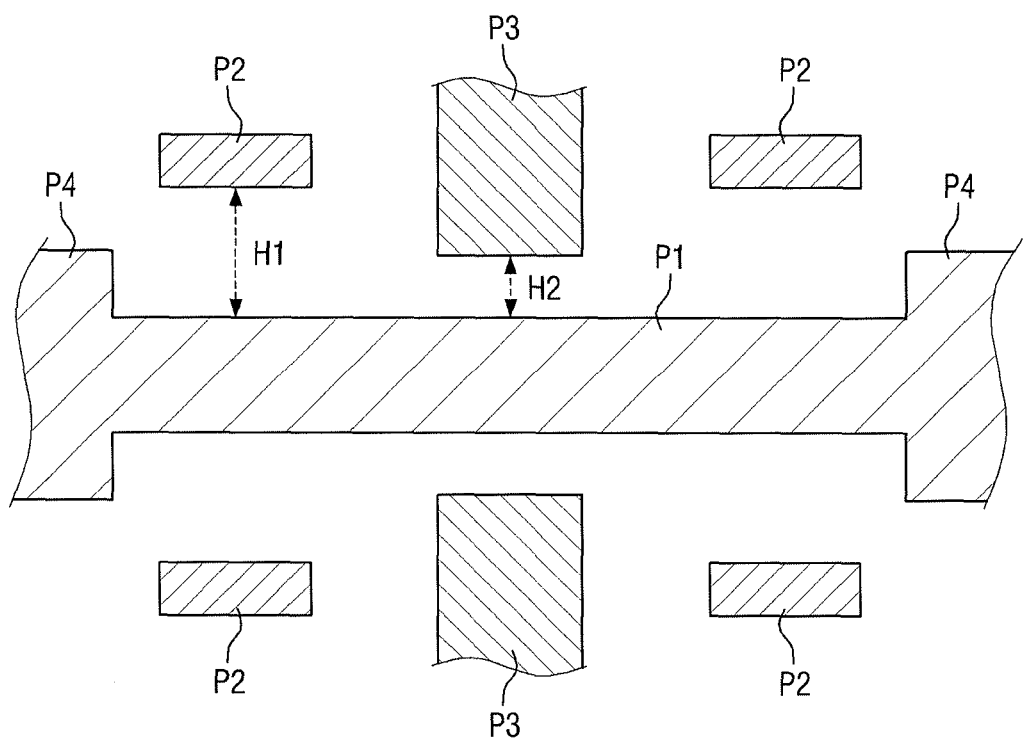
FIG. 5 illustrates an exemplary diagram of a target pattern for describing the method for measuring the critical dimension of the mask pattern according to the first embodiment.
Figure 6:
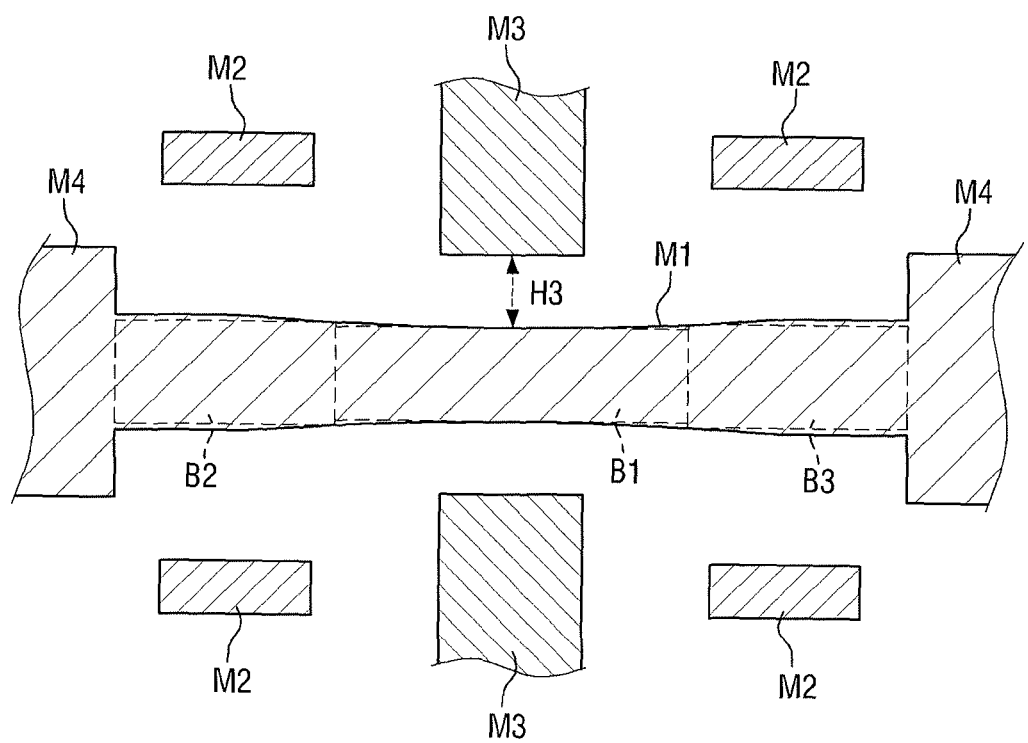
FIG. 6 illustrates an exemplary diagram of a mask pattern for describing the method for measuring the critical dimension of the mask pattern according to the first embodiment.

FIG. 5 illustrates an exemplary diagram of a target pattern for describing the method for measuring the critical dimension of the mask pattern according to the first embodiment, and FIG. 6 illustrates an exemplary diagram of a mask pattern for describing the method for measuring the critical dimension of the mask pattern according to the first embodiment. FIG. 7 illustrates an exemplary diagram of a design of an optically proximity-corrected mask pattern for describing the method for measuring the critical dimension of the mask pattern according to the first embodiment.

Referring to FIG. 5, the target pattern may include a plurality of patterns P1 to P4 as an example. The target pattern may include a first target pattern P1 extended in a straight line, a second target pattern P2 and a third target pattern P3 positioned at the side of the first target pattern P1, and a fourth target pattern P4 extended from the first target pattern P1 and having a different critical dimension.

The second target pattern P2 and the third target pattern P3 positioned at the side of the first target pattern P1 may be spaced apart from each other with different intervals. For example, a distance H1 between the first target pattern P1 and the second target pattern P2 may be larger than a distance H2 between the first target pattern P1 and the third target pattern P3.

Referring to FIGS. 5 and 6, the mask pattern may include a plurality of patterns M1 to M4 corresponding to the plurality of patterns P1 to P4 of the target pattern as an example. First to fourth mask patterns M1 to M4 corresponding to the first to fourth patterns P1 to P4, respectively may be included.

The distance between the first target pattern P1 and the third target pattern P3 may be small, and the first mask pattern M1 may have a different shape from the first target pattern P1. The first mask pattern M1 may have a region with a critical dimension which is smaller than the critical dimension of the first target pattern P1, and a distance H3 between the third mask pattern M3 and the first mask pattern M1 may be larger than the distance H1 between the third target pattern P3 and the first target pattern P1. A phenomenon, in which the distance between the target patterns becomes smaller than the distance between the mask patterns due to a characteristic such as refraction of light, may need to be considered.

The first mask pattern M1 may be divided into three block regions. For example, the first mask pattern M1 may be divided into a first block B1, a second block B2, and a third block B3. Since the first block B1 is adjacent to the third mask pattern M3, the critical dimension may be decreased. Since the second block B2 is not adjacent to the third mask pattern M3, the critical dimension thereof may not be decreased or may be decreased less than that of the first block B1.

Figure 7:
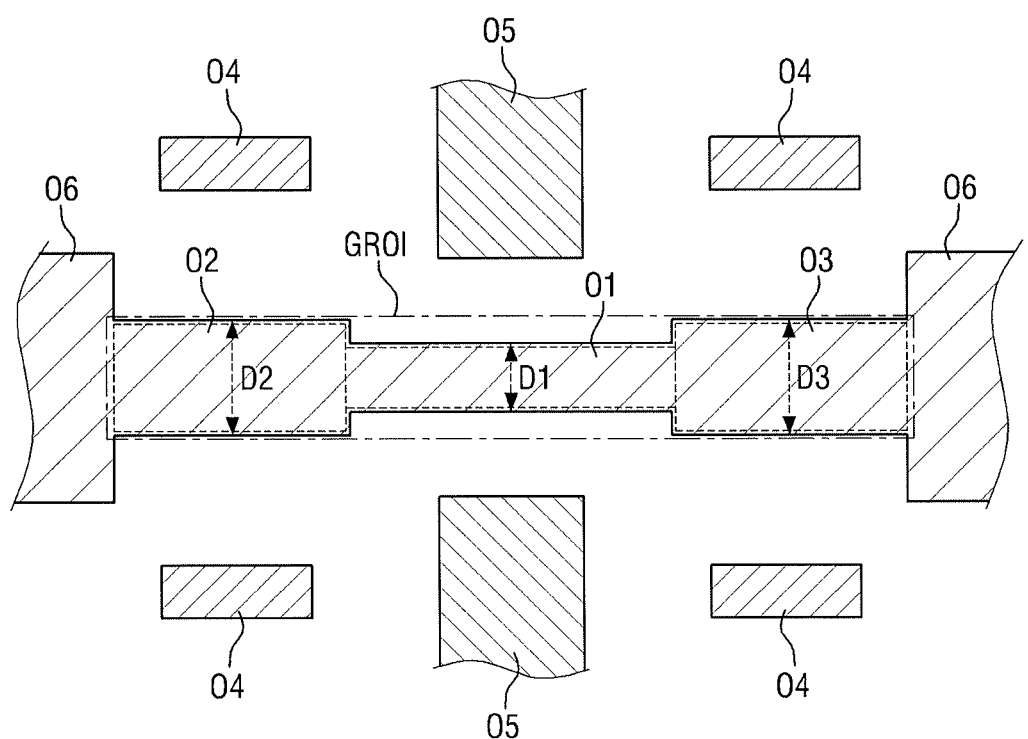
FIG. 7 illustrates an exemplary diagram of a design of an optically proximity-corrected mask pattern for describing the method for measuring the critical dimension of the mask pattern according to the first embodiment.

FIG. 7 illustrates an exemplary diagram of a design of an optically proximity-corrected mask pattern for describing the method for measuring the critical dimension of the mask pattern according to the first embodiment.

Referring to FIGS. 5 to 7, the design of the mask pattern may include a plurality of blocks O1 to O6 corresponding to the plurality of patterns P1 to P4 of the target pattern and the plurality of patterns M1 to M4 of the mask pattern as an example.

The first to third design blocks O1 to O3 may correspond to the first target pattern P1 and the first mask pattern M1, and the fourth to sixth design blocks O4 to O6 may correspond to the second to fourth target patterns P2 to P4 and the second to fourth mask patterns M2 to M4, respectively.

The first to third design blocks O1 to O3 may correspond to the first to third blocks B1 to B3 of FIG. 6. The design of the mask pattern may include box-shaped blocks, and each of the first to third design blocks O1 to O3 may have a rectangular shape.

The design of the mask pattern may be a design which is optically proximity-corrected due to the characteristic such as refraction of light, and the first design block O1 may have a critical dimension smaller than those of the second design block O2 and the third design block O3.

When a region of interest of the design of the mask pattern is the first design block O1, not all of the first to third design blocks O1 to O3 but only the first design block O1 may become the ROI of the design of the mask pattern, and a length of the ROI may be relatively smaller than that of the design of the mask pattern before the optical proximity correction.

Figure 8:
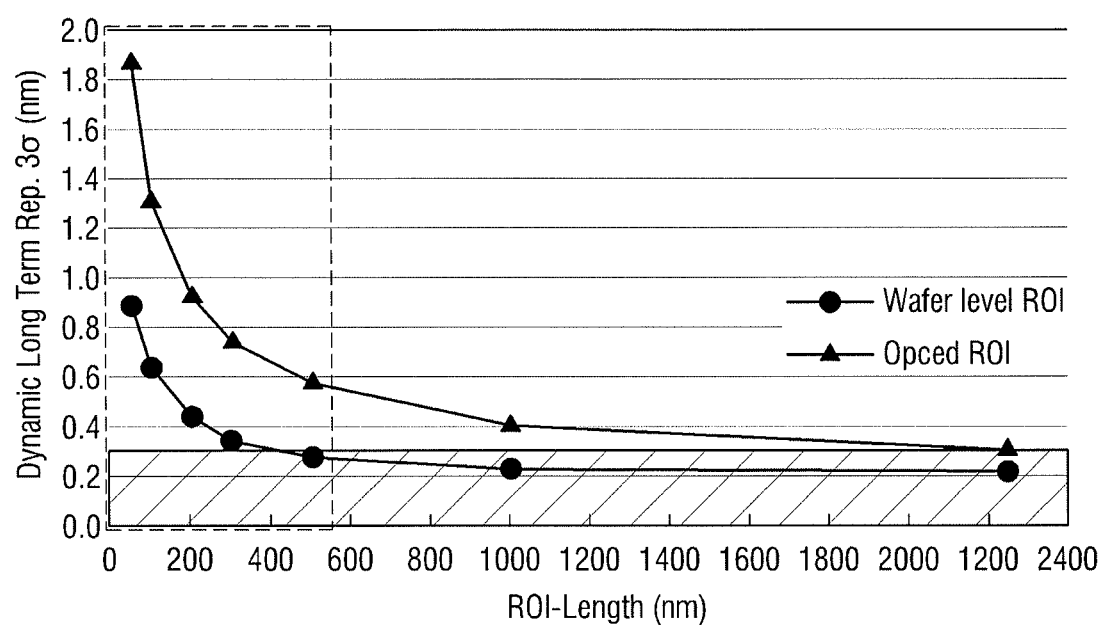
FIG. 8 illustrates a graph comparing an actual critical dimension of a mask pattern at a wafer level and a critical dimension of the mask pattern measured by the measuring device according to a size of a region of interest.

FIG. 8 illustrates a graph comparing an actual critical dimension of a mask pattern at a wafer level and a critical dimension of the mask pattern measured by the measuring device according to a size of a region of interest.

Referring to FIG. 8, an actual critical dimension value at the wafer level is represented by a circle in a graph in FIG. 8, and a value of measuring the critical dimension of the optically proximity-corrected mask pattern through the measuring device is represented by a triangle. A horizontal axis of the graph in FIG. 8 corresponds to a length of the ROI, and a vertical axis of the graph in FIG. 8 corresponds to a critical dimension measured by the measuring device.

When the length of the ROI is 600 nm or more, a difference between the actual critical dimension of the mask pattern at the wafer level and the critical dimension measured by the measuring device may be not large, and reliability of the measuring device may be relatively high.

When the length of the ROI is less than 600 nm, the difference between the actual critical dimension of the mask pattern at the wafer level and the critical dimension measured by the measuring device may be large, and reliability of the measuring device may be low.

Figure 9:
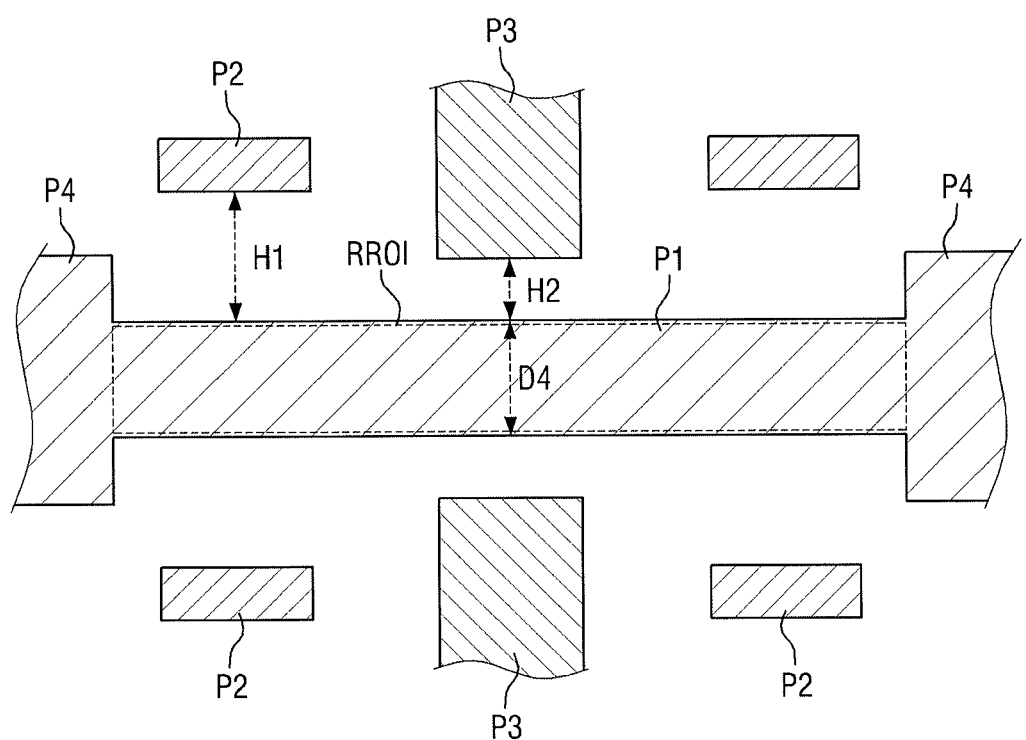
FIG. 9 illustrates an exemplary diagram of a target pattern having a reference region of interest for describing the method for measuring the critical dimension of the mask pattern according to the first embodiment.

FIG. 9 illustrates an exemplary diagram of a target pattern having a reference region of interest for describing the method for measuring the critical dimension of the mask pattern according to the first embodiment.

Referring to FIGS. 7 to 9, a difference in the reliability of the measuring device may be very large depending on the length of the ROI. In the case of performing optical proximity correction for generating the mask pattern, the length of the ROI may be decreased from several times to tens of times regardless of the intent, and the reliability of the measurement of the critical dimension of the mask pattern through the optical proximity correction is very low.

The method for measuring the critical dimension of the mask pattern according to the first embodiment may use a method of enhancing reliability of the measuring device by expanding the ROI through data in which the optical proximity correction is not performed like the first target pattern P1 of the target pattern.

The critical dimension of the first target pattern P1 may be uniformly extended as D4, and the first target pattern P1 may be determined as a reference region of interest (RROI). The design of the mask pattern may define a group region of interest (GROI) with reference to the RROI. The GROI may extend the length of the ROI of the first design block O1 to help more accurate and reliable measurement of the critical dimension.

Referring back to FIG. 2, the mask pattern may be generated (S130).

The mask pattern may be generated based on the second mask design, which is optically proximity-corrected. The mask pattern may have a shape which is the same as or similar to the second mask design. For example, the mask pattern may be manufactured the same as the shape of the second mask design, except that the shape is caused by the manufacturing process.

Referring back to FIG. 1, the critical dimension of the ROI of the mask pattern may be measured (S200).

The mask pattern may be manufactured by the second mask design. The mask pattern may be formed by the optically proximity-corrected pattern, and the ROI of the mask pattern may have a smaller length than the ROI of the target pattern. To distinguish the ROI of the mask pattern from other regions of interest, the ROI of the mask pattern may be defined as a target region of interest (target ROI). The critical dimension of the target ROI may be measured by the measuring device.

The length of the target ROI may be small, reliability of the measured result of the measuring device may be low, and it may be necessary to enhance the reliability by correcting the length of the target ROI later.

The measurement of the critical dimension of the target ROI may be performed immediately after the mask pattern is generated, but may be performed later. For example, a timing of the measurement of the critical dimension of the target ROI is not limited to an order illustrated in FIG. 1.

Next, the GROI may be determined (S300).

The group region of interest (group ROI or GROI) may be a region where the target ROI is expanded. The group ROI may be determined to enhance reliability of the measuring device by extending the length of the ROI.

Figure 10:
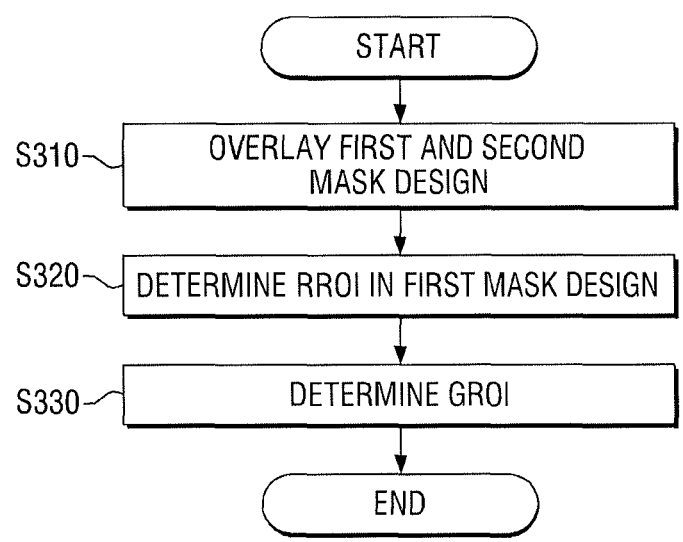
FIG. 10 illustrates a flowchart for describing an operation of determining a group region of interest of FIG. 1 in detail.
Figure 11:
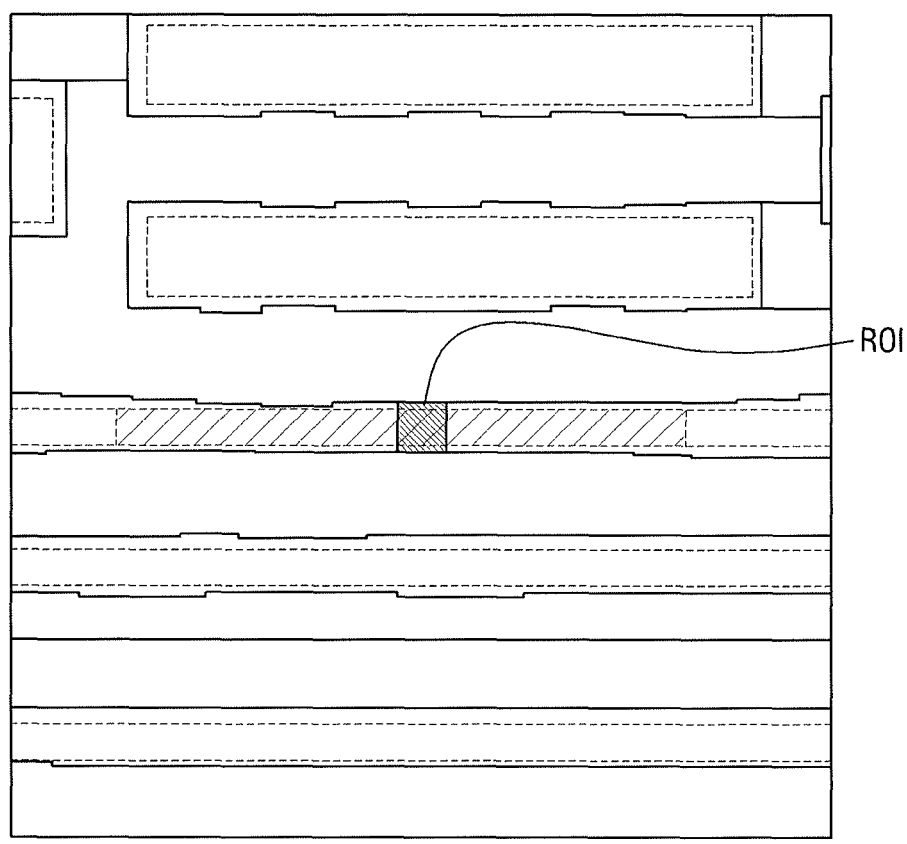
FIG. 11 illustrates a diagram overlaying the design of the mask pattern before optical proximity correction of FIG. 3 and the design of the mask pattern after optical proximity correction of FIG. 4.
Figure 12:
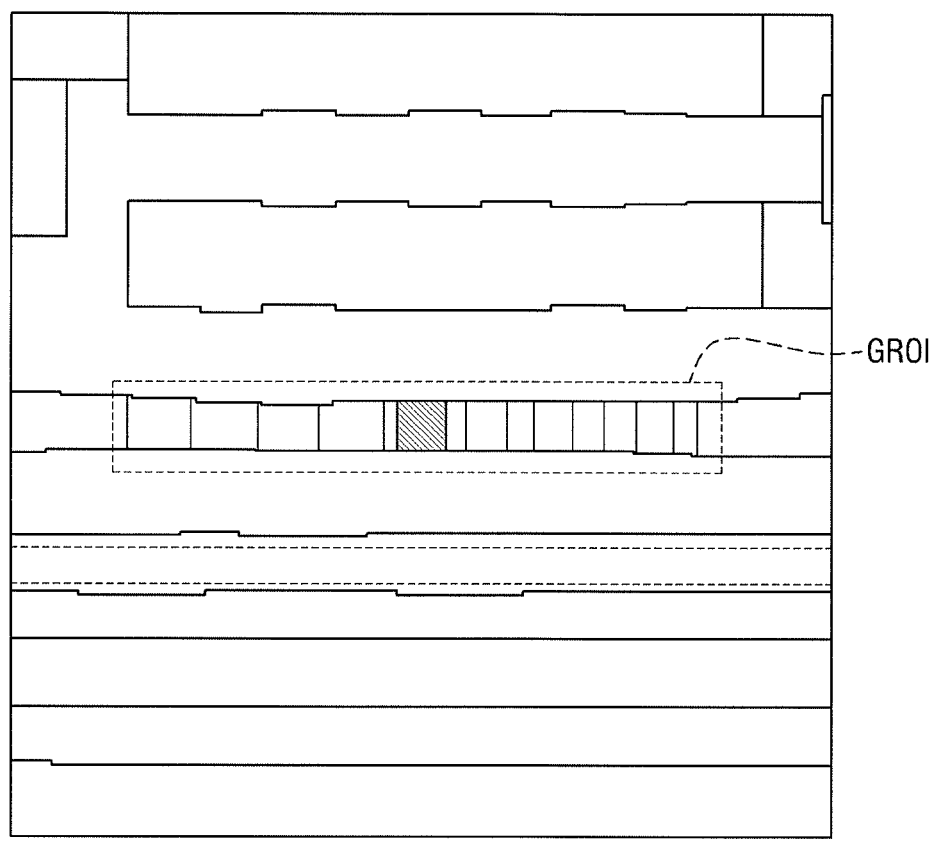
FIG. 12 illustrates a diagram of a group region of interest enlarged in the design of the mask pattern after optical proximity correction of FIG. 4.

FIG. 10 illustrates a flowchart for describing an operation of determining a group region of interest of FIG. 1 in detail, and FIG. 11 illustrates a diagram overlaying the design of the mask pattern before optical proximity correction of FIG. 3 and the design of the mask pattern after optical proximity correction of FIG. 4. FIG. 12 illustrates a diagram of a group ROI enlarged in the design of the mask pattern after optical proximity correction of FIG. 4.

Referring to FIG. 10, the first and second mask designs are overlaid with each other (S310).

Referring to FIG. 11, the first mask design is represented by a dotted line. The second mask design formed by optically proximity-correcting the first mask design is represented by a solid line. The second mask design may be a design in which the CD of the first mask design is re-adjusted, and only the CD of the block of the design may vary.

Referring back to FIG. 10, the RROI may be determined in the first mask design (S320).

Referring to FIG. 11, the second mask design may include a target region of interest (ROI). The first mask design overlapped with the second mask pattern may determine a region corresponding to the target ROI to the RROI.

The length of the RROI as a region having the same CD may be much larger than the length of the target ROI. For example, since the first mask design is a design before optical proximity correction, the first mask design may be similar to the shape of the target pattern. For example, each CD may not be re-adjusted, a linear region may elongate, and the RROI, which is a region having the same CD, may be defined to be larger than the target ROI.

Referring back to FIG. 10, the group ROI may be determined (S330).

Referring to FIG. 12, a group region of interest (GROI) corresponding to the RROI may be determined in the second mask pattern. The GROI may be a region defined by the length corresponding to the RROI by including the neighboring block of the target ROI.

The GROI may include a plurality of blocks. The block may be a contacting region having the same CD in each block, and the blocks may be box shapes bounded by portions of which the CDs vary.

Referring back to FIG. 1, the critical dimension of the group region of interest may be measured (S400).

Referring to FIGS. 11 and 12, the GROI may include a plurality of blocks. All of CDs of the plurality of blocks may be measured. Since the GROI includes the target ROI, the CD of the target ROI may be measured. If the CD of the target ROI is measured in advance (S200 of FIG. 1), the CD of the target ROI may not be redundantly measured again. For example, the measuring time of the CD of the target ROI is not particularly limited.

Referring back to FIG. 1, the CD of the target ROI may be corrected (S500).

In the CD of the target ROI, as described above, the length of the target ROI may be small, reliability in measurement of the measuring device may be low, and the CD of the target ROI may be corrected by using the CD of the GROI.

Figure 13:
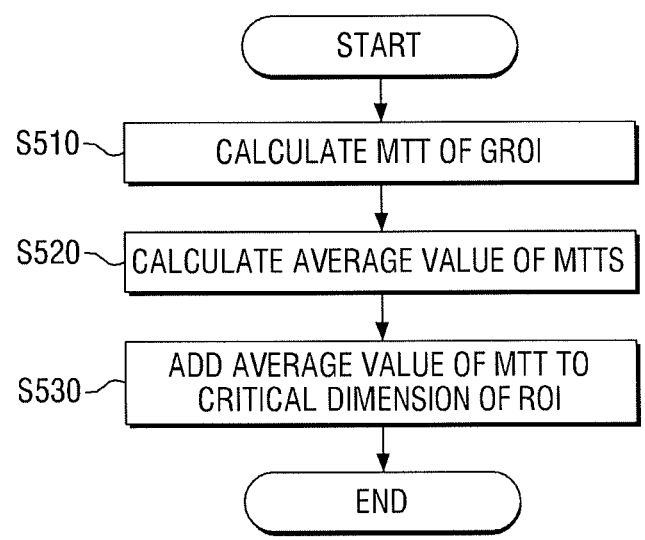
FIG. 13 illustrates a flowchart for describing an operation of correcting a critical dimension of the region of interest of FIG. 1 in detail.
Figure 14:
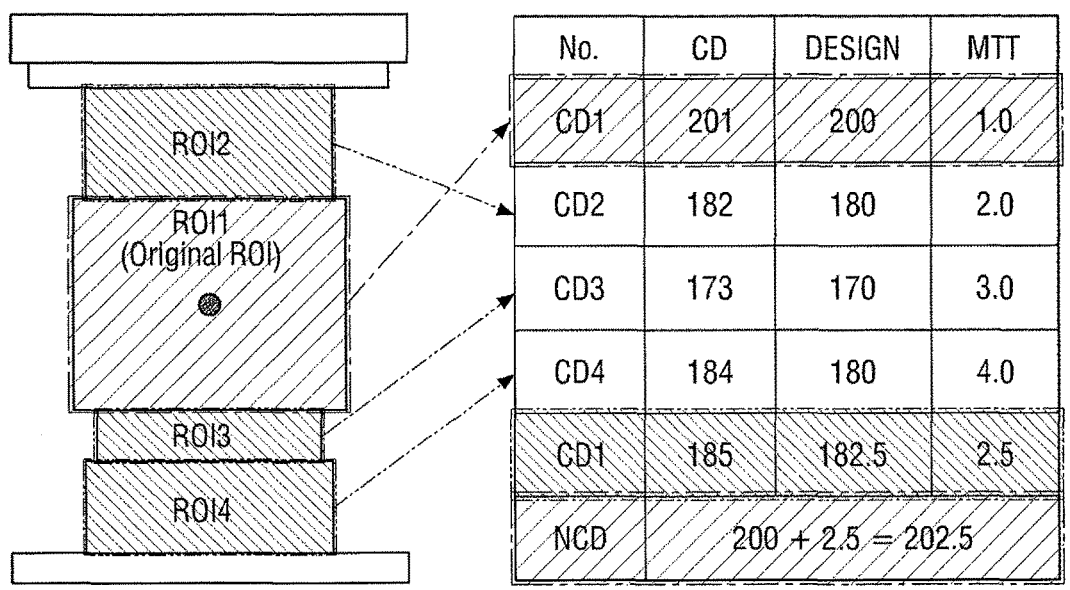
FIG. 14 illustrates an exemplary diagram for describing an operation of correcting a critical dimension of the region of interest of FIG. 1 in detail.

FIG. 13 illustrates a flowchart for describing an operation of correcting a critical dimension of the region of interest of FIG. 1 in detail, and FIG. 14 illustrates an exemplary diagram for describing an operation of correcting a critical dimension of the region of interest of FIG. 1 in detail.

Referring to FIG. 13, a mean to target of the group region of interest may be calculated (S510).

Referring to FIG. 14, the GROI may include a target ROI ROI1 and neighboring blocks ROI2 to ROI4. The length of the target ROI may be small, just immediately measuring the CD of the target ROI ROI1 may be low in reliability, and the immediate measurement of the CD may be corrected. For example, a difference between the CD of the second mask design, for example, the optically proximity-corrected mask design and the CD measured by the measuring device, may be calculated. The difference between the CDs may be defined as a mean to target (MTT).

The MTT may be calculated with respect to the entire GROI. For example, the MTTs may be calculated with respect to all of the target ROI ROI1 and the neighboring blocks ROI2 to ROI4, respectively. In FIG. 14, in the target ROI ROI1, the MTT may be 1.0, and in the neighboring blocks ROI2 to ROI4, the MTTs may be 2.0, 3.0, and 4.0, respectively.

Referring back to FIG. 13, an average value of the MTTs may be calculated (S520).

Referring to FIG. 14, the average value of the MTTs is 2.5, which is an average value of 1.0, 2.0, 3.0, and 4.0. For example, the mean to target of the group regions of interest ROI1 to ROI4 may be higher than the target ROI ROI1, and an actual measuring value of the target ROI ROI1 may need to be more largely corrected.

Referring back to FIG. 13, the average value of the MTTs may be added to the CD of the target ROI (S530).

Referring to FIG. 14, 2.5, which is the average value of the MTTs, may be added to a critical dimension of 200 on the design of the target ROI ROI1, and 202.5, which is the corrected measuring value, may be acquired by a normalized CD based on the design target CD (NCD).

The method for measuring the critical dimension of the mask pattern according to the first embodiment may include extending the length of the ROI to enhance the reliability of the measuring device. The reliability of the measuring device may be increased as the length of the ROI is increased, and the length of the ROI may be unintentionally decreased by the optical proximity correction process, and the reliability of the measuring device may be decreased. In the method for measuring the critical dimension of the mask pattern according to the first embodiment, the reliability of the measuring device may be increased by extending the length of the ROI using the mask design before the optical proximity correction process.

Hereinafter, a method for measuring a critical dimension of a mask pattern according to a second embodiment will be described with reference to FIGS. 15 to 19. The duplicated parts with the aforementioned first embodiment will be simplified or omitted.

Figure 15:
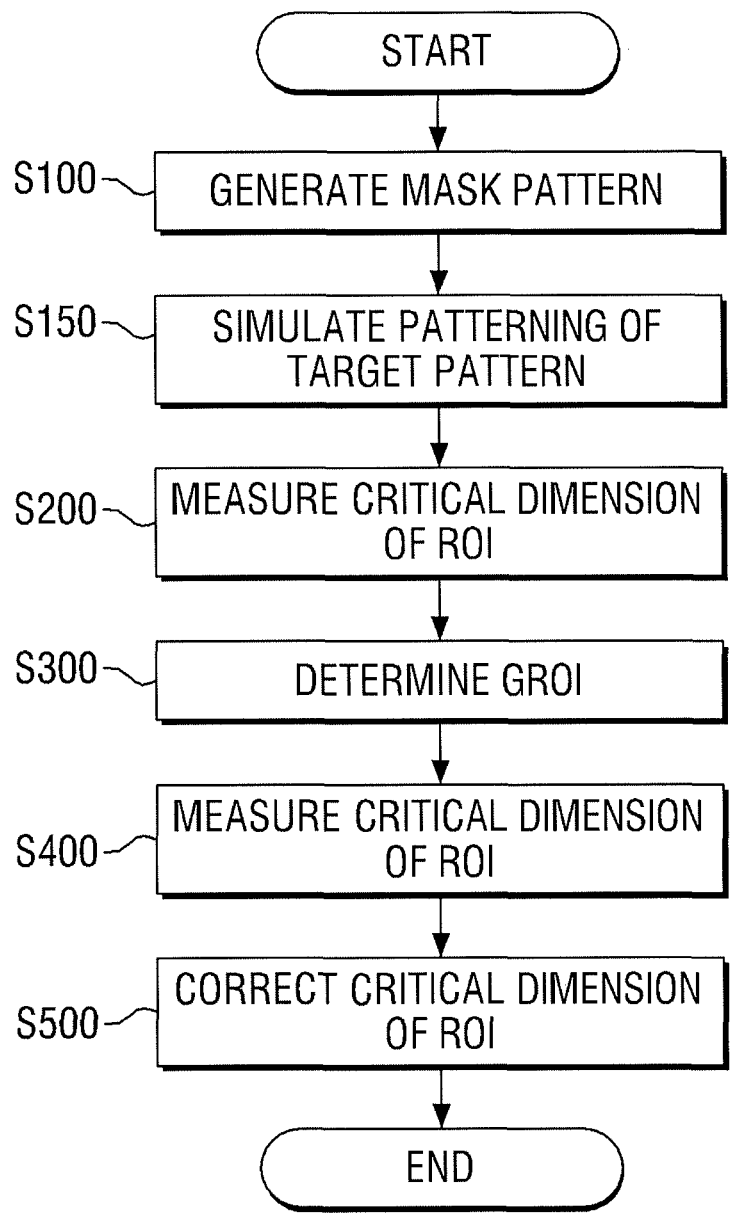
FIG. 15 illustrates a flowchart for describing a method for measuring a critical dimension of a mask pattern according to a second embodiment.
Figure 16:
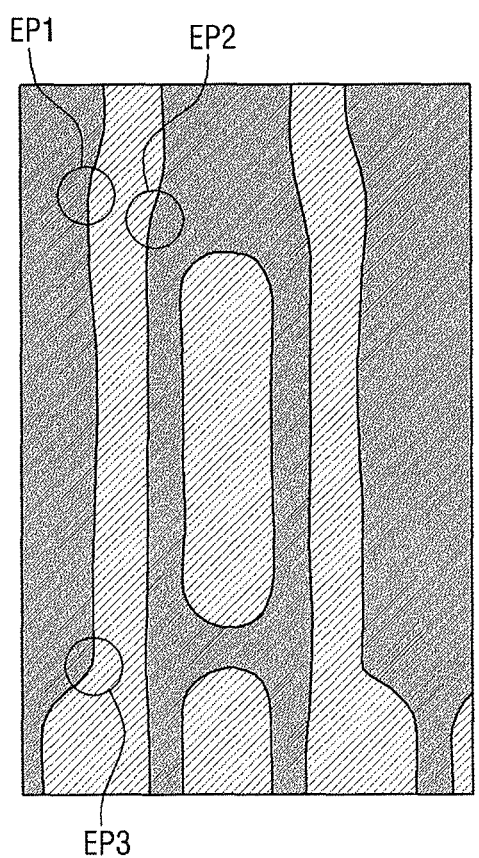
FIG. 16 illustrates an exemplary diagram of a simulation result image of patterning the target pattern according to the mask pattern.

FIG. 15 illustrates a flowchart for describing a method for measuring a critical dimension of a mask pattern according to a second embodiment, and FIG. 16 illustrates an exemplary diagram of a simulation result image of patterning the target pattern according to the mask pattern.

Referring to FIG. 15, the mask pattern may be generated (S100), and next, the patterning of the target pattern may be simulated (S150).

Referring to FIG. 16, which target pattern may be generated before the target pattern is patterned by using the mask design may be simulated.

In the simulation result, the shape may not be completely the same as the shape of the target pattern which is actually formed, but a similar shape may be output as the result. When the mask pattern is manufactured, the result may be predicted without patterning, and usability in terms of costs may be large.

An image in the simulation result may be used to define the GROI by determining the RROI because critical dimensions are not discontinuously formed like the design of the optically proximity-corrected mask pattern.

Referring back to FIG. 15, the CD of the ROI of the mask pattern may be measured (S200).

The mask pattern may be formed by the optically proximity-corrected pattern, and the ROI of the mask pattern may have a smaller length than the ROI of the target pattern. To distinguish the ROI of the mask pattern from other ROIs, the region of interest of the mask pattern may be defined as a target region of interest (target ROI). The CD of the target ROI may be measured by the measuring device. The length of the ROI may be small, reliability of the measured result of the measuring device may be low, and it may be necessary to enhance the reliability by correcting the length of the target region of interest later.

The measurement of the CD of the target ROI may be performed immediately after the mask pattern is generated, but may be performed later. For example, a timing of the measurement of the CD of the target ROI is not limited to an order illustrated in FIG. 15.

Next, a group region of interest may be determined (S300).

The group region of interest (group ROI) may be a region where the target region of interest is expanded. The group ROI may be determined to enhance reliability of the measuring device by extending the length of the ROI.

Figure 17:
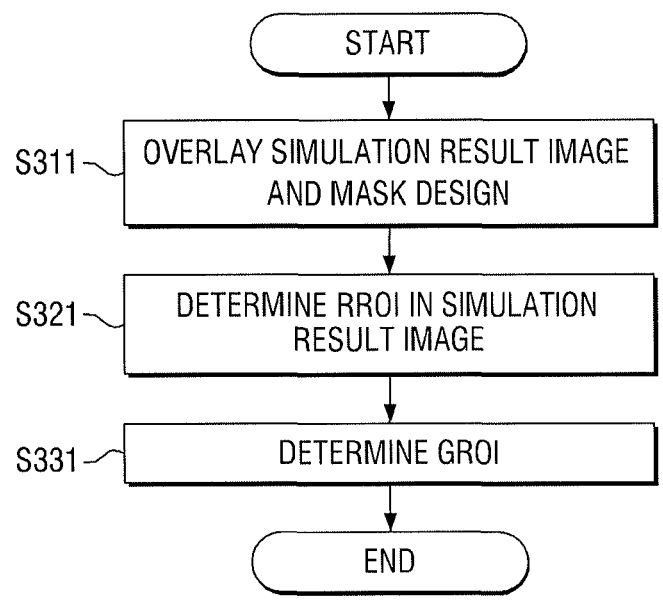
FIG. 17 illustrates a flowchart for describing an operation of determining a group region of interest of FIG. 15 in detail.

FIG. 17 illustrates a flowchart for describing an operation of determining a group region of interest of FIG. 15 in detail.

Referring to FIG. 17, the simulation result image and the mask design are overlaid with each other (S311).

Since the mask pattern is formed based on the mask design, and the target pattern may be simulated by using the mask design, the mask design and the simulation result image are not completely the same as each other, but may have similar and corresponding shapes.

Next, the RROI may be determined in the simulation result image (S321).

The RROI in the simulation result image may be formed to be larger than the target ROI of the mask design. Because of a simulation using the optically proximity-corrected mask design to form an original linear target pattern, a linear result may be caused.

Figure 18:
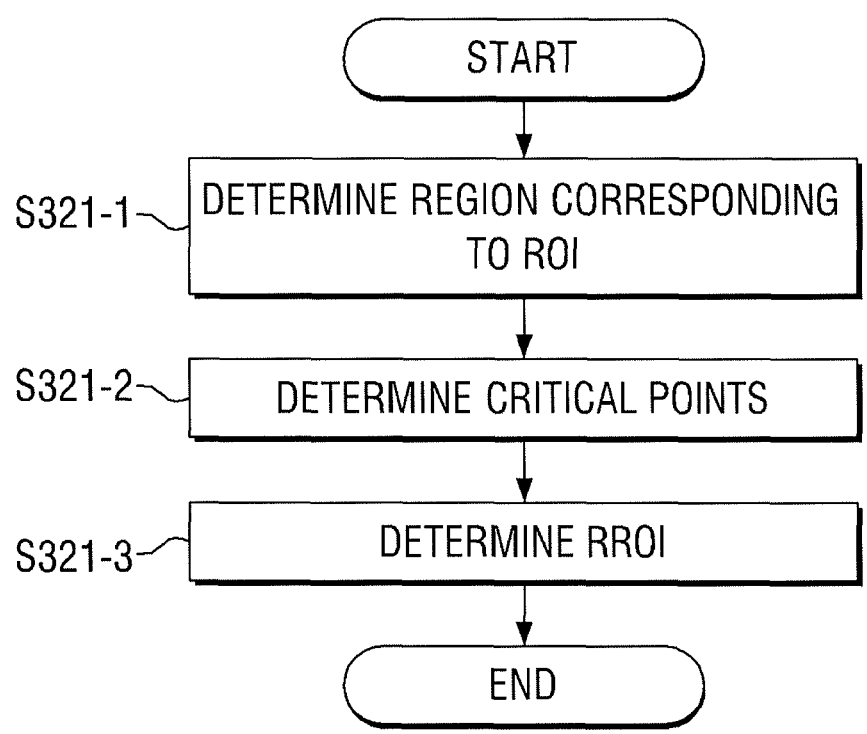
FIG. 18 illustrates a flowchart for describing an operation of determining a reference region of interest of FIG. 17 in detail.
Figure 19:
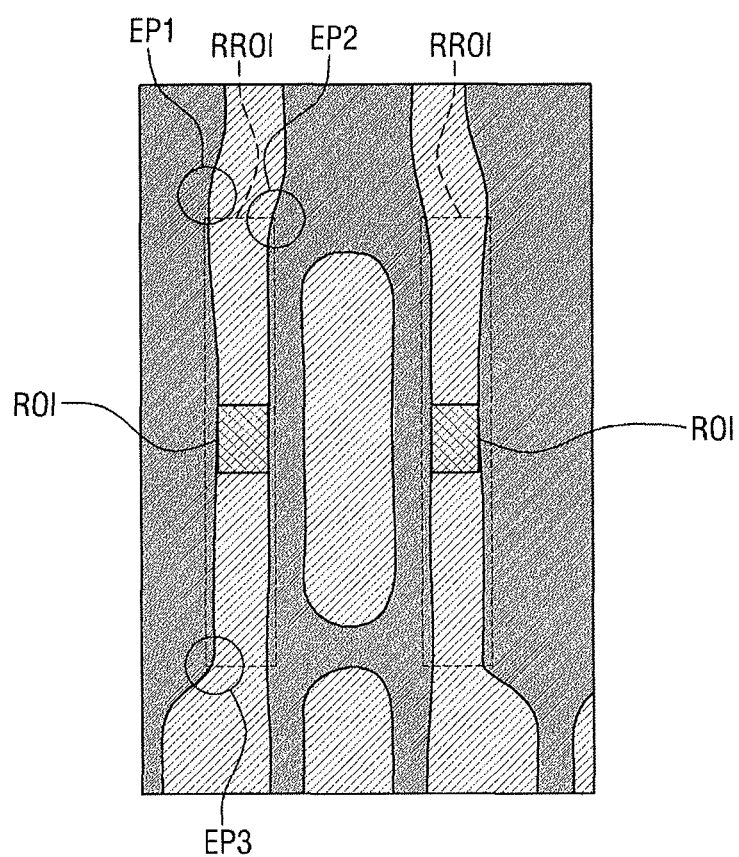
FIG. 19 illustrates a diagram of a simulation result image in which the reference region of interest is set.

FIG. 18 illustrates a flowchart for describing an operation of determining a reference region of interest of FIG. 17 in detail, and FIG. 19 illustrates a diagram of a simulation result image in which the reference region of interest is set.

Referring to FIG. 18, a region corresponding to the target ROI may be determined in the simulation result image (S321-1).

Referring to FIG. 19, the region corresponding to the target ROI may be found and then an extended region in the region may need to be selected as the RROI. First, the region corresponding to the RROI in the overlaid region may be found.

Referring back to FIG. 18, critical points are determined (S321-2).

Referring to FIG. 19, critical points EP1 to EP3 may be found by various methods. The critical points EP1 to EP3 may be detected by using one or more of contrast of a pixel, edge detection, or a slope of an edge.

In the simulation result image, the contrast may vary according to a height and a contour of the target, and when a place where the contrast rapidly varies through an image analysis is found, the critical points EP1 to EP3 may be found.

Like the edge detection, the critical points EP1 to EP3 may be detected by using an image analysis method or in the case where the slope of an edge is a predetermined critical value or more.

Referring back to FIG. 18, the reference region of interest (RROI) may be determined.

Referring to FIG. 19, a region connecting the critical points may be determined as the RROI. The RROI may be formed to be larger than the target ROI. The RROI may be formed by connecting the most adjacent critical points EP2 and EP3 forming a box among the critical points EP1 to EP3.

Referring back to FIG. 17, the group region of interest (GROI) may be determined (S331).

The GROI corresponding to the RROI may be determined in the mask design. The GROI may be a region defined by the length corresponding to the RROI by including the neighboring block of the target ROI.

The GROI may include a plurality of blocks. The block may be a contacting region having the same CD in each block, and the blocks may be box shapes bounded by portions of which the CDs vary.

Referring back to FIG. 15, the critical dimension of the GROI may be measured (S400).

The GROI may include a plurality of blocks. All of respective critical dimensions of the plurality of blocks may be measured. Since the GROI includes the target ROI, the CD of the target ROI may be measured. If the CD of the target ROI is measured in advance (S200 of FIG. 15), the CD of the target ROI may not be redundantly measured again. For example, the measuring time of the CD of the target ROI is not particularly limited.

Next, the CD of the target ROI may be corrected (S500).

In the CD of the target ROI, as described above, the length of the target ROI may be small, reliability in measurement by the measuring device may be low, and the CD of the target ROI may be corrected by using the CD of the GROI.

Hereinafter, a method for measuring a critical dimension of a mask pattern according to a third embodiment will be described with reference to FIGS. 20 to 24. The duplicated parts with the aforementioned first and second embodiments will be simplified or omitted.

Figure 20:
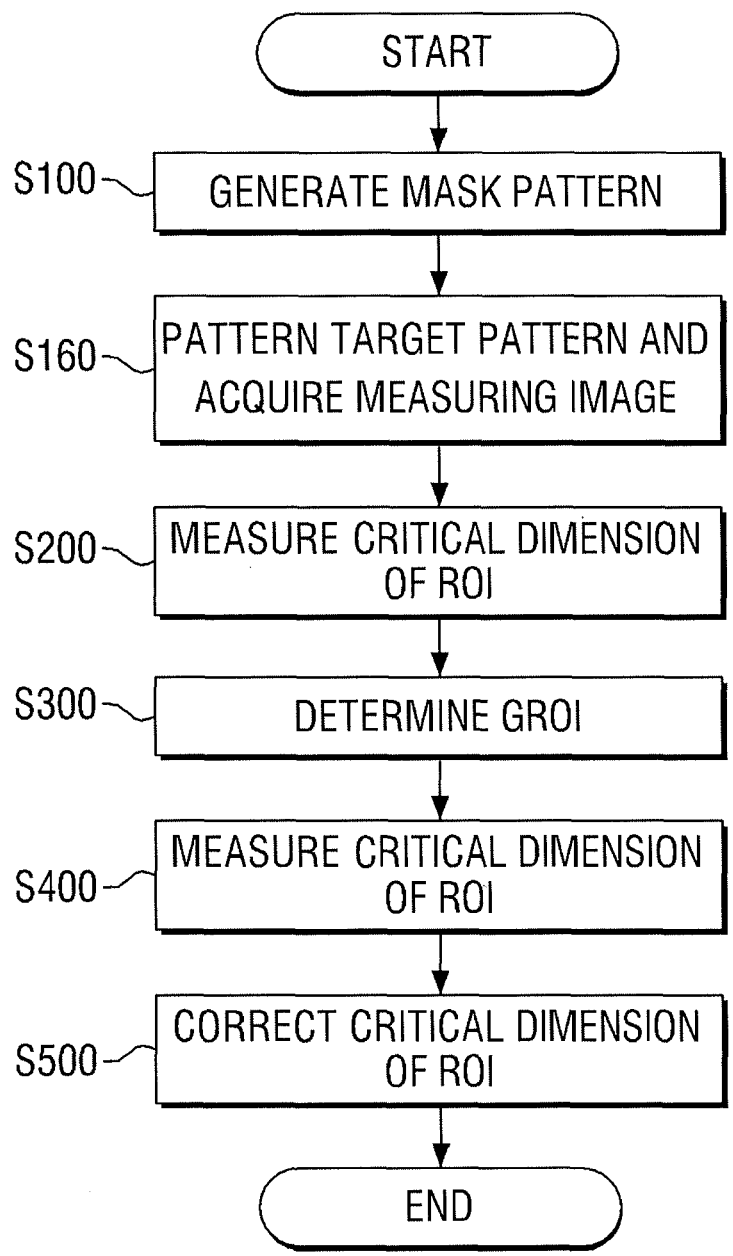
FIG. 20 illustrates a flowchart for describing a method for measuring a critical dimension of a mask pattern according to a third embodiment.

FIG. 20 illustrates a flowchart for describing a method for measuring a critical dimension of a mask pattern according to a third embodiment.

Referring to FIG. 20, a mask pattern may be generated (S100), and next, a target pattern may be patterned, and a measuring image of the target pattern may be acquired (S160).

The target pattern may be patterned through lithography and etching processes by using the mask pattern after generating the mask pattern. Such a target pattern may be a pattern formed by an optically proximity-corrected mask pattern. The optical proximity correction of the mask pattern may remove a change in actual critical dimension of the target pattern, and in the target pattern, the CD may not be discontinuously formed like the design of the mask pattern.

The target pattern may be patterned to acquire the measuring image of the target pattern. As long as the measuring image is an image representing the target pattern, the measuring image is not particularly limited. The measuring image may include, for example, a scanning electron microscope (SEM) image.

Next, the critical dimension of the region of interest of the mask pattern may be measured (S200).

The mask pattern may be formed by the optically proximity-corrected pattern, and the ROI of the mask pattern may have a smaller length than the ROI of the target pattern. To distinguish the ROI of the mask pattern from other ROIs, the region of interest of the mask pattern may be defined as a target region of interest (target ROI). The CD of the target ROI may be measured by the measuring device. The length of the ROI may be small, reliability of the measured result of the measuring device may be low, and it may be necessary to enhance the reliability by correcting the length of the target region of interest later.

The measurement of the CD of the target ROI may be performed immediately after the mask pattern is generated, but may be performed later. For example, a timing of the measurement of the CD of the target ROI is not limited to an order illustrated in FIG. 20.

Next, a group region of interest may be determined (S300).

The group region of interest (group ROI) may be a region where the target region of interest is expanded. The group ROI may be determined to enhance reliability of the measuring device by extending the length of the ROI.

Figure 21:
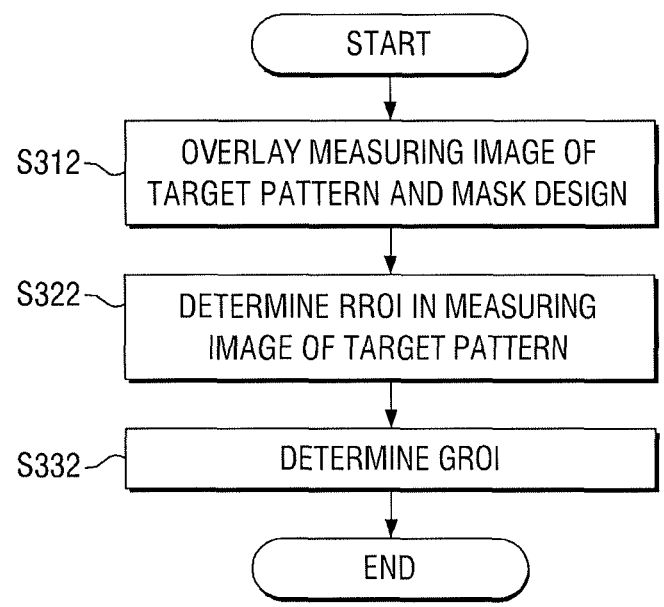
FIG. 21 illustrates a flowchart for describing an operation of determining a group region of interest of FIG. 20 in detail.
Figure 22:
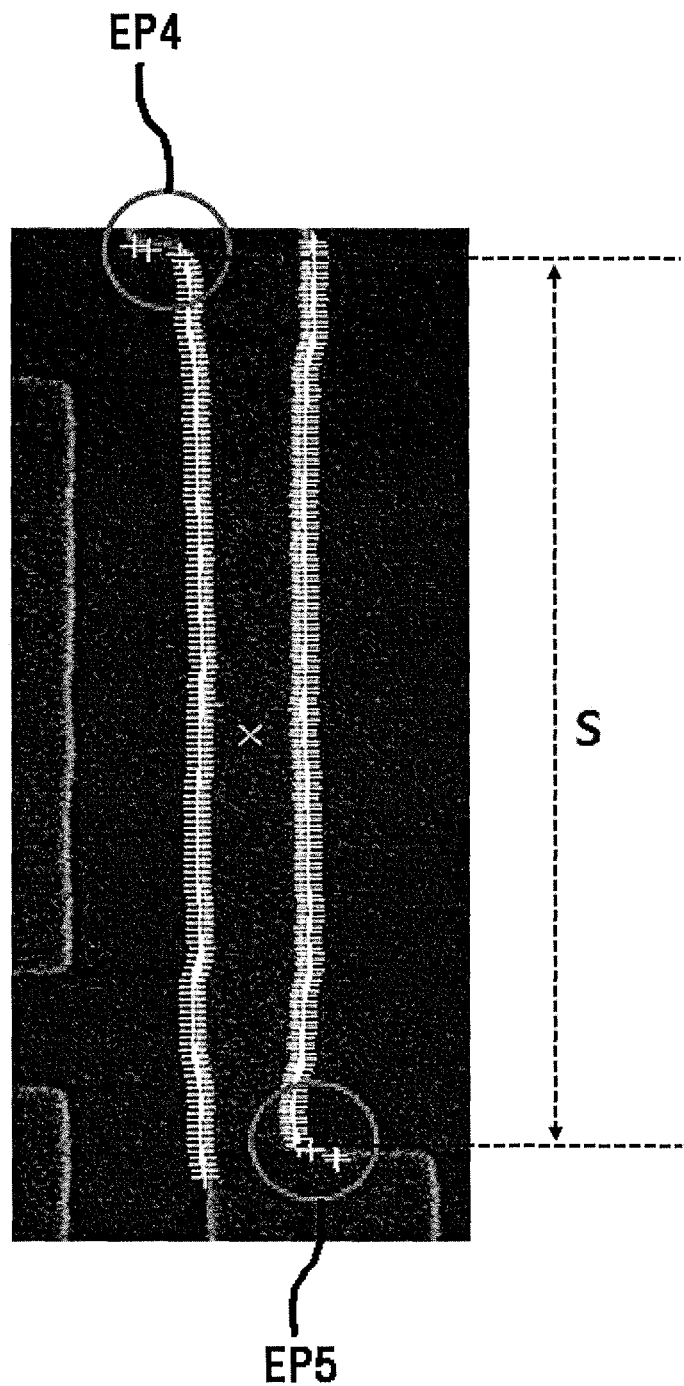
FIG. 22 illustrates an exemplary diagram for describing an operation for extracting an edge from a scanning electron microscope (SEM) image of a target pattern.
Figure 23:
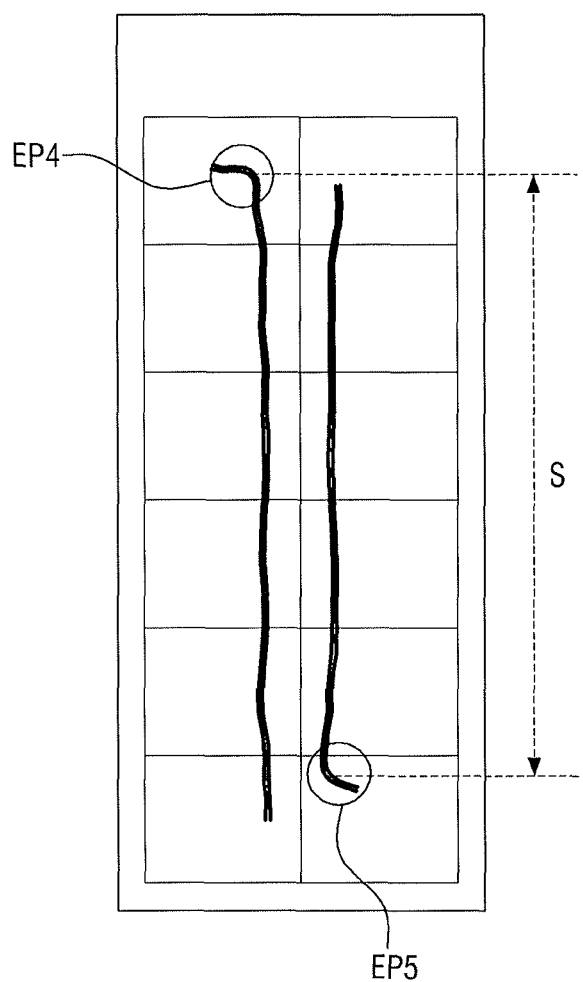
FIG. 23 illustrates an exemplary diagram of a graph of an edge extraction result according to the operation for extracting an edge of FIG. 22.
Figure 24:
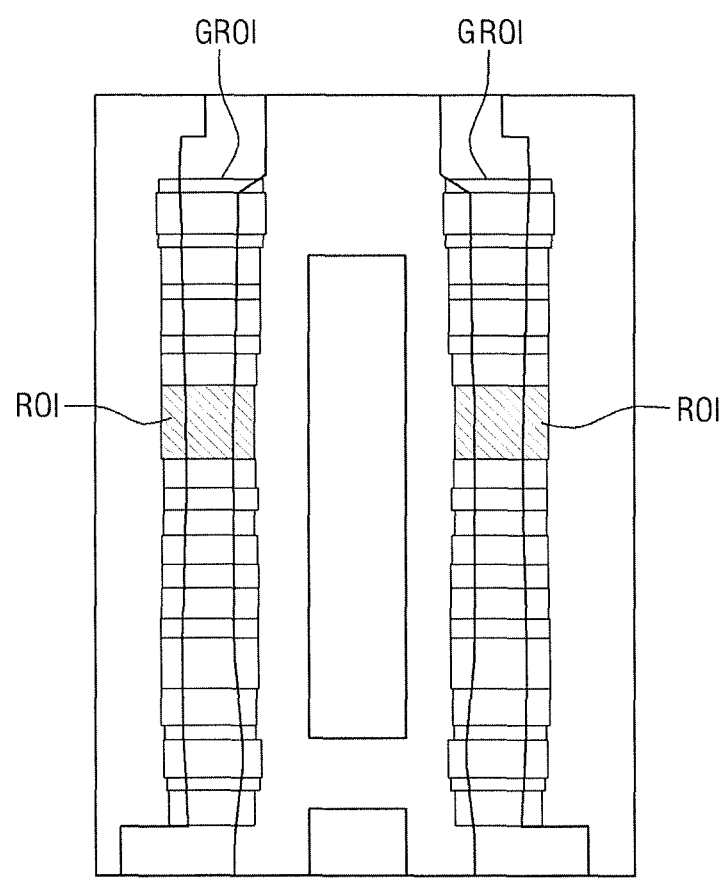
FIG. 24 illustrates a diagram overlaying a reference region of interest of the SEM image with the design of the mask pattern after optical proximity correction.

FIG. 21 illustrates a flowchart for describing an operation of determining a group region of interest of FIG. 20 in detail, and FIG. 22 illustrates an exemplary diagram for describing an operation for extracting an edge from a scanning electron microscope (SEM) image of a target pattern. FIG. 23 illustrates an exemplary diagram of a graph of an edge extraction result according to the operation for extracting an edge of FIG. 22, and FIG. 24 illustrates a diagram overlaying a reference region of interest of the SEM image with the design of the mask pattern after optical proximity correction.

Referring to FIG. 21, the measuring image of the target pattern and the mask design are overlaid with each other (S312).

Since the mask pattern is formed based on the mask design and the target pattern is patterned by using the mask design, the mask design and the measuring image of the target pattern may not be completely the same as each other, but may have similar and corresponding shapes.

Next, the RROI may be determined in the measuring image of the target pattern (S322).

Referring to FIG. 20, the RROI of the measuring image of the target pattern may be formed to be larger than the target ROI of the mask design. The optical proximity correction may be performed in the mask design to form an original linear target pattern.

To determine the RROI, a region corresponding to the target ROI may be found, and critical points EP4 and EP5 in a region extended from the region may be found. A method of finding the critical points may be various. The critical points may be detected by using one or more of contrast of a pixel, edge detection, or a slope of an edge.

Referring to FIGS. 20 and 21, the critical points may be found by using edge detection. All edges of the portion extended form the region corresponding to the target ROI may be detected on a cycle of 10 pixels. Portions where the change in critical dimension is large may be determined as the critical points EP4 and EP5. A region connecting all the critical points may be determined as the RROI. In FIGS. 20 and 21, a region having a distance of S may be the RROI.

Referring back to FIG. 21, the group ROI may be determined (S332).

Referring to FIG. 24, in the mask design, the portion corresponding to the RROI of the measuring image of the target pattern may be determined as the group region of interest (GROI). The GROI may be a region defined by the length corresponding to the RROI by including the neighboring block of the target ROI.

The GROI may include a plurality of blocks. The block may be a contacting region having the same CD in each block, and the blocks may be box shapes bounded by portions of which the CDs vary.

Referring back to FIG. 20, the critical dimension of the GROI may be measured (S400).

The GROI may include a plurality of blocks. All of respective critical dimensions of the plurality of blocks may be measured. Since the GROI includes the target ROI, the CD of the target ROI may be measured. If the CD of the target ROI is measured in advance (S200 of FIG. 20), the CD of the target ROI may not be redundantly measured again. For example, the measuring time of the CD of the target ROI is not particularly limited.

Next, the CD of the target ROI may be corrected (S500).

In the CD of the target ROI, as described above, the length of the target ROI may be small, reliability in measurement of the measuring device may be low, and the CD of the target ROI may be corrected by using the CD of the GROI.

Hereinafter, a method for measuring a critical dimension of a mask pattern according to a fourth embodiment will be described with reference to FIGS. 1 to 27. The duplicated parts with the aforementioned first to third embodiments will be simplified or omitted.

Referring back to FIG. 1, the mask pattern may be generated (S100), and the critical dimension of the region of interest of the mask pattern may be measured (S200).

The mask pattern may be formed by the optically proximity-corrected pattern, and the ROI of the mask pattern may have a smaller length than the ROI of the target pattern. To distinguish the ROI of the mask pattern from other ROIs, the region of interest of the mask pattern may be defined as a target region of interest (target ROI). The CD of the target ROI may be measured by the measuring device. The length of the ROI may be small, reliability of the measured result of the measuring device may be low, and it may be necessary to enhance the reliability by correcting the length of the target region of interest later.

The measurement of the CD of the target ROI may be performed immediately after the mask pattern is generated, but may be performed later on. For example, a timing of the measurement of the CD of the target ROI is not limited to an order illustrated in FIG. 1.

Next, the group region of interest may be determined (S300).

The group region of interest (group ROI) may be a region where the target region of interest is expanded. The group ROI may be determined to enhance reliability of the measuring device by extending the length of the ROI.

Figure 25:
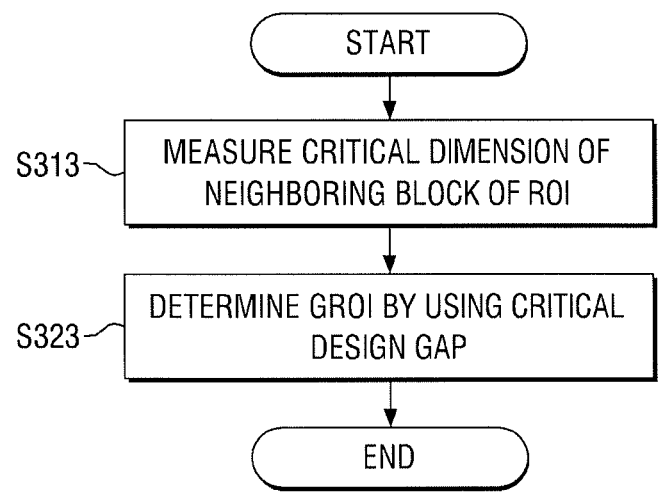
FIG. 25 illustrates a flowchart for describing the operation of determining the group region of interest of FIG. 1 in detail in order to describe a method for measuring a critical dimension of a mask pattern according to a fourth embodiment.
Figure 26:
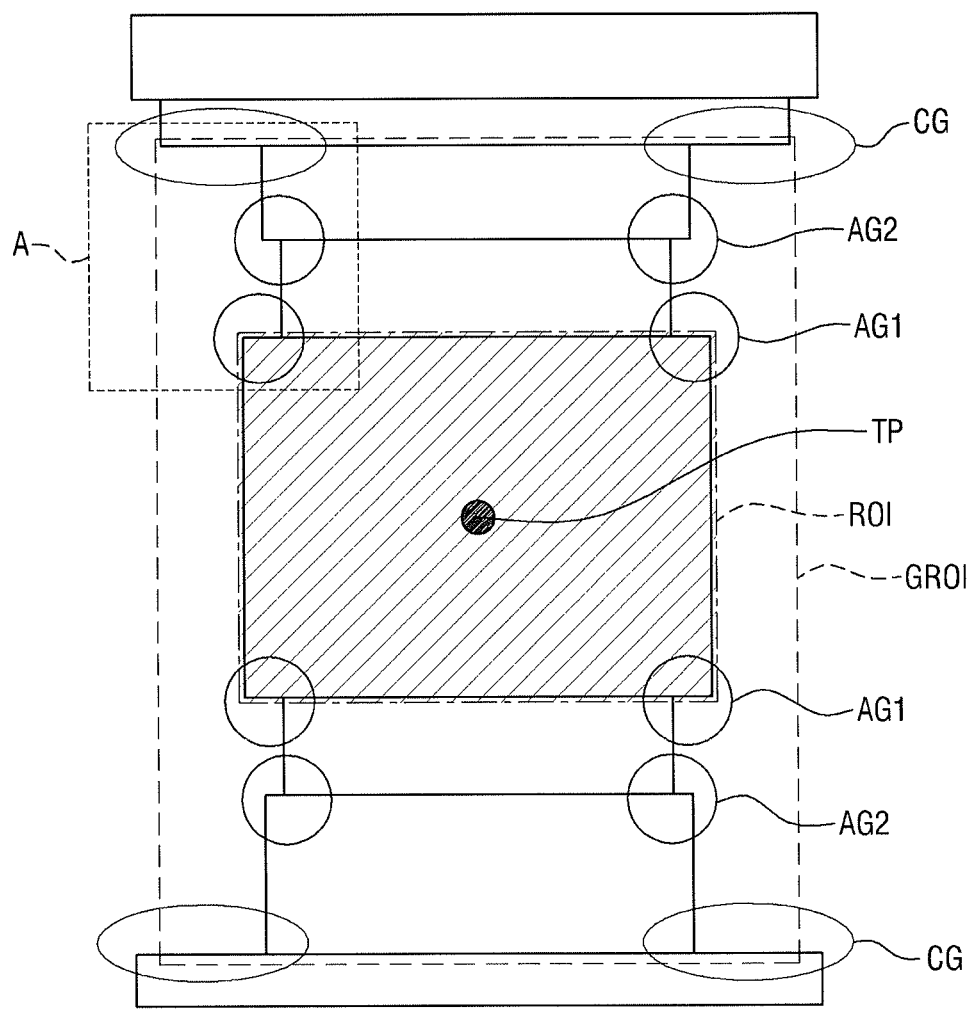
FIG. 26 illustrates an exemplary diagram of a difference in critical dimension between a region of interest of the mask pattern after optical proximity correction and a neighboring block.
Figure 27:
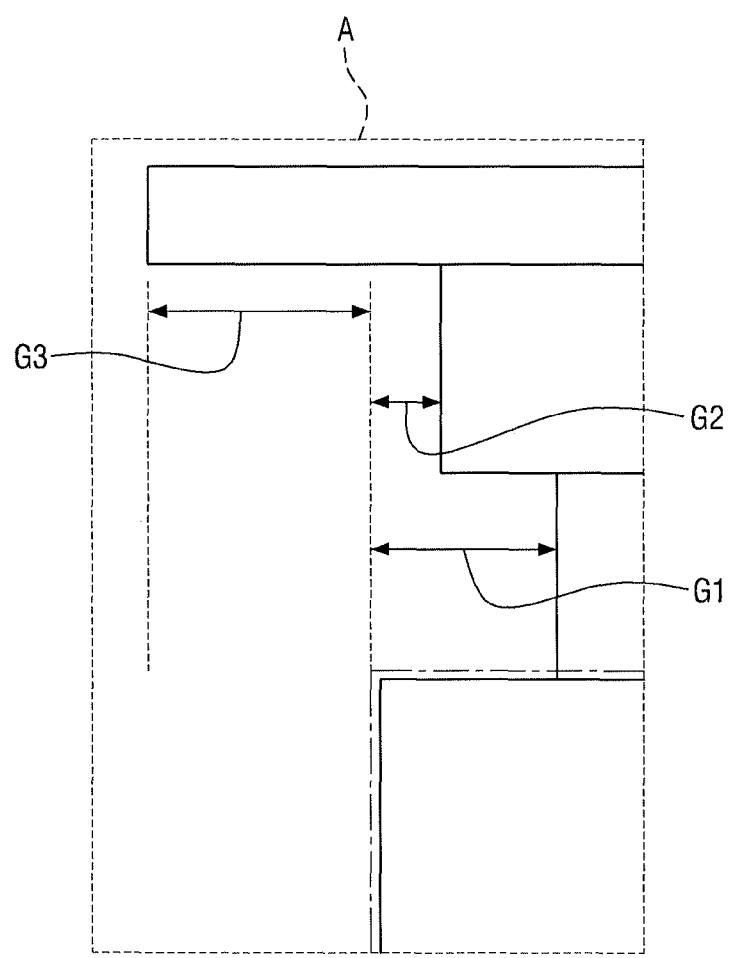
FIG. 27 illustrates an enlarged diagram enlarging a portion A of FIG. 26.

FIG. 25 illustrates a flowchart for describing the operation of determining the group region of interest of FIG. 1 in detail in order to describe a method for measuring a critical dimension of a mask pattern according to a fourth embodiment, and FIG. 26 illustrates an exemplary diagram of a difference in critical dimension between a region of interest of the mask pattern after optical proximity correction and a neighboring block. FIG. 27 illustrates an enlarged diagram enlarging a portion A of FIG. 26.

Referring to FIG. 25, a critical dimension of a neighboring block of the target ROI in the design of the mask pattern may be measured (S313).

Referring to FIG. 26, the mask pattern design may include a target position TP, a target ROI, an available design gap AG, a critical design gap CG, and a group region of interest (GROI).

The target position TP refers to a portion, e.g., position, to measure the critical dimension. When the target position TP is determined, the target ROI to which the target position TP belongs may be determined. The target ROI is a region having the same critical dimension as the target position TP.

Adjacent blocks of the target ROI may be regions having the same critical dimension as each other. Critical dimensions of the neighboring blocks are measured. First, the critical dimension of the nearest neighboring block may be measured. In an embodiment, for example, there may be two extending directions, and there may be two nearest neighboring blocks.

The available design gap AG refers to a portion where a difference between the CD of the neighboring block and the CD of the target ROI is smaller than a predetermined critical design gap. Neighboring blocks having the available design gap AG may be included in the GROI.

When it is determined that the neighboring block has the available design gap AG, the corresponding neighboring block is included in the GROI, and the CD of another neighboring block, which is nearest to the corresponding neighboring block, may be measured. When a newly measured neighboring block also has the available design gap AG, the newly measured neighboring block is included in the GROI, and the CD of another neighboring block, which is nearest to the included neighboring block, may be continuously measured.

When the difference between the CD of the neighboring block and the CD of the target ROI is larger than the predetermined critical design gap, the difference may correspond to the critical design gap CG. The neighboring block having the critical design gap CG may not be included in the GROI.

Referring to FIG. 27, a first gap G1 and a second gap G2 may be smaller than the critical design gap CG, and the neighboring blocks corresponding to the first gap G1 and the second gap G2 may correspond to the available design gap AG. A third gap G3 may be larger than the critical design gap, and the neighboring block corresponding to the third gap G3 may correspond to the critical design gap CG.

Referring back to FIG. 25, the GROI may be determined by using the critical design gap (S323).

Referring to FIG. 26, the GROI may include the neighboring blocks having the available design gap AG, but may not include the neighboring blocks having the critical design gap CG. All of the neighboring blocks having the available design gap AG may need to contact each other. For example, when the neighboring block having the critical design gap CG exists between the neighboring blocks having the available design gap AG, only the neighboring block having the available design gap AG, which is close to the target ROI based on the neighboring block having the critical design gap CG, may be included in the GROI.

By the method for measuring the critical dimension of the mask pattern in the embodiment, the GROI may be determined only by setting the critical design gap without other external data, thereby more simply and efficiently grouping the ROI of the mask pattern.

Referring back to FIG. 1, the critical dimension of the GROI may be measured (S400).

The GROI may include a plurality of blocks. All of critical dimensions of the plurality of blocks may be measured. The GROI may include the target ROI, and the CD of the target ROI may be measured. If the CD of the target ROI is measured in advance (S200 of FIG. 1), the CD of the target ROI may not be redundantly measured again. For example, the measuring time of the CD of the target ROI is not particularly limited.

In the embodiment, all the CDs of the neighboring blocks may be measured in advance in the process where the GROI is determined, and the CD may not be redundantly measured again. For example, the measuring times of the CDs of the entire GROI in addition to the target ROI are not particularly limited.

Next, the CD of the target ROI may be corrected (S500).

In the CD of the target ROI, as described above, the length of the target ROI may be small, reliability in measurement by the measuring device may be low, and the CD of the target ROI may be corrected by using the CD of the GROI.

Hereinafter, a method for measuring a critical dimension of a mask pattern according to a fifth embodiment will be described with reference to FIGS. 28 and 29. The duplicated parts with the aforementioned first to fourth embodiments will be simplified or omitted.

Figure 28:
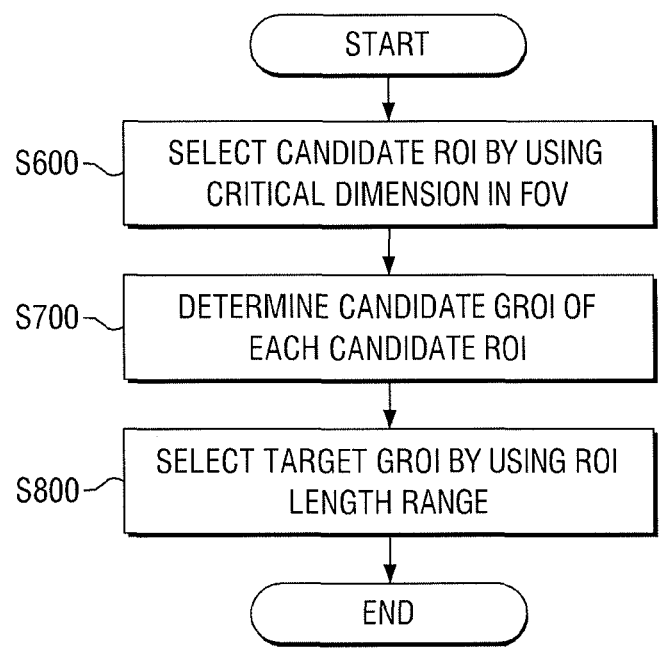
FIG. 28 illustrates a flowchart for describing a method for measuring a critical dimension of a mask pattern according to a fifth embodiment.

FIG. 28 illustrates a flowchart for describing a method for measuring a critical dimension of a mask pattern according to the fifth embodiment.

Figure 29:
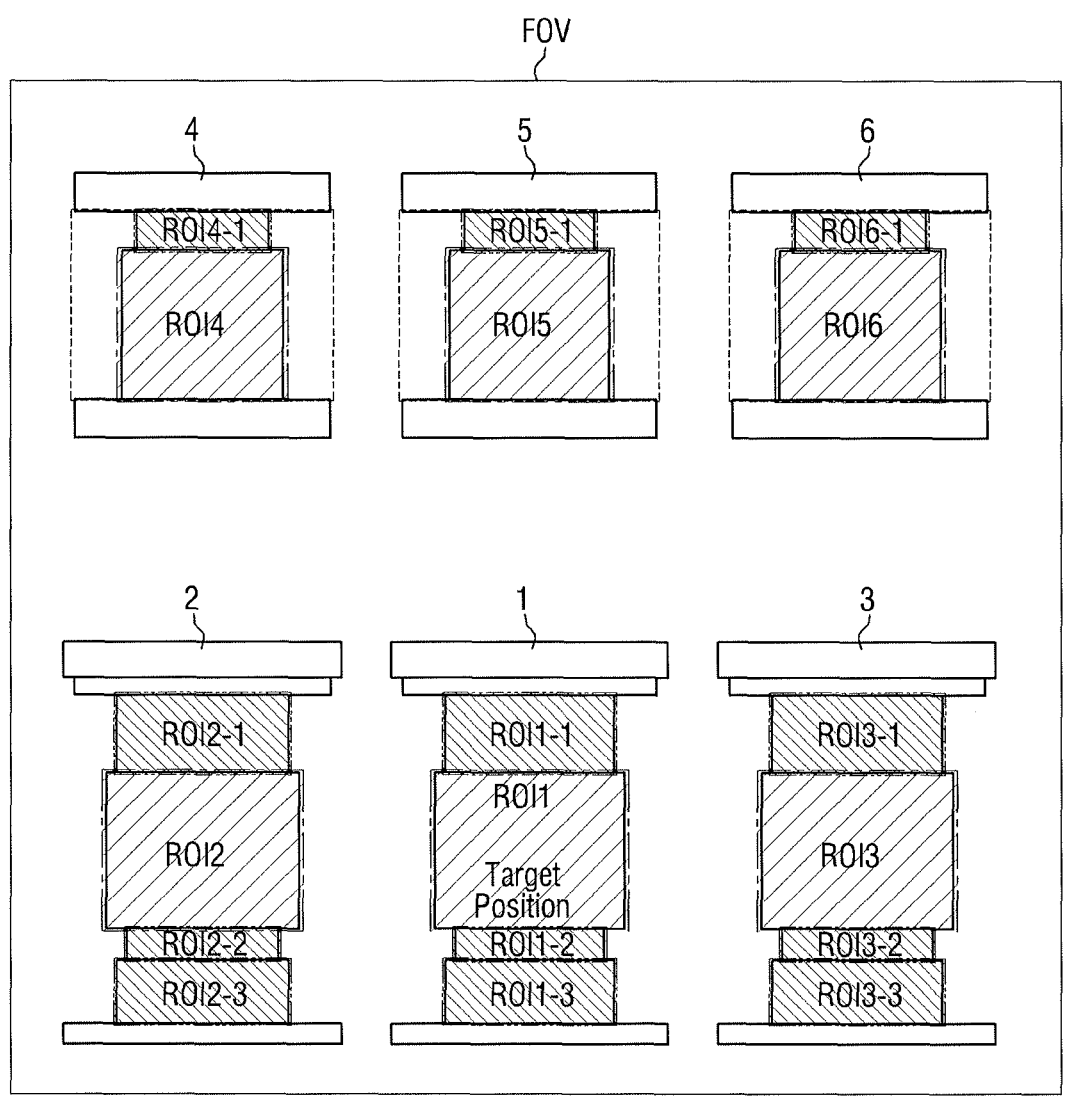
FIG. 29 illustrates a conceptual diagram of a field of view (FOV) of a measuring device for describing the method for measuring the critical dimension of the mask pattern according to the fifth embodiment.

FIG. 29 illustrates a conceptual diagram of a field of view (FOV) of a measuring device for describing the method for measuring the critical dimension of the mask pattern according to the fifth embodiment.

Referring to FIG. 28, a candidate region of interest may be selected by using a critical dimension in a field of view (FOV) of the measuring device.

In the FOV of the measuring device, patterns having various regions may be displayed at once, and a measuring operator may not easily check which pattern is a target pattern. At this time, a plurality of patterns having the critical dimension among many patterns may be determined as the candidate region of interest by using the critical dimension.

The "critical dimension" may include a minute difference or a predetermined mean to target range.

Referring to FIG. 29, there may be one a target position among many patterns in the FOV, but since there may be many similar patterns, which pattern is the target pattern may be confused, and candidate regions of interest ROI1 to ROI6 may be determined by using the critical dimensions, which are known.

The candidate regions of interest ROI1 to ROI6 may be adjacent to neighboring blocks ROI1-1 to ROI1-3, ROI2-1 to ROI2-3, ROI3-1 to ROI3-3, ROI4-1, ROI5-1, and ROI6-1, respectively.

Referring back to FIG. 28, a candidate group region of interest of each candidate region of interest may be determined (S700).

Referring to FIG. 29, each of the candidate regions of interest ROI1 to ROI6 may have each of candidate group regions of interest 1 to 6 according to the method for grouping the region of interest of the mask pattern according to the first to fourth embodiments.

Referring back to FIG. 28, a target group region of interest may be selected by using a predetermined ROI length range.

Referring to FIG. 29, the candidate group regions of interest 4 to 6 having lengths beyond the ROI length range may be excluded by using the predetermined ROI length range.

Next, a candidate group region of interest 1, which is most similar to the predetermined ROI length among the remaining candidate group regions of interest 1 to 3, may be selected as the target group region of interest. The target group region of interest may include a target region of interest of the measuring operator.

Next, the critical dimension of the region of interest may be measured, and the critical dimension of the region of interest may be corrected by measuring the critical dimension of the neighboring block of the target group region of interest. The measuring operator may easily find the target region of interest and measure the critical dimension of the region of interest with high reliability.

By way of summation and review, in a method of measuring a CD of a pattern, a pattern image may be obtained from an object pattern. A design pattern of the object pattern and the pattern image may be matched to determine a detection region on the pattern image. An optimum turning point of the pattern contour may be determined in the detection region and an ROI may be set within a predetermined range from the optimum turning point. A CD of the pattern may be measured in the ROI.

Measurement of a CD of a mask pattern may be performed by a measuring device, and the measuring device may measure the CD by determining an ROI of the mask pattern. The size of the ROI may be relatively small, and an error budget may be large.

Provided is a method for measuring a CD of a mask pattern that may minimize an error budget in a measuring device for measuring the CD of a mask pattern. Also provided is a method for grouping an ROI of a mask pattern design that may minimize an error budget in a measuring device for measuring a CD of the mask pattern.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for measuring a critical dimension of a mask pattern, comprising:
   generating a mask pattern using an optically proximity-corrected (OPC) mask design including at least one block;
   measuring a first critical dimension (CD) of a target-region of interest (target-ROI) including neighboring blocks having a same critical dimension, in the mask pattern;
   determining a group region of interest including the target-ROI and at least one neighboring block adjacent to the target-ROI;
   measuring second CDs of the at least one neighboring block of the group region of interest; and
   correcting a measuring value of the first CD using a measuring value of the second CDs,
   wherein correcting the measuring value of the first CD includes:
   calculating a first mean to target between the measuring value of the first CD and the first CD in the mask design;
   calculating a second mean to targets between measuring values of the second CDs of the at least one neighboring block of the group region of interest and the second CD of the mask design for each block, respectively; and
   correcting the measuring value of the first CD by normalizing the first mean to target and the second mean to target.

2. The method as claimed in claim 1, wherein generating the mask pattern includes:
   generating a first mask design;
   generating a second mask design by optically proximity-correcting the first mask design; and
   generating the mask pattern according to the second mask design.

3. The method as claimed in claim 2, wherein determining the group region of interest includes:
   overlaying the first mask design with the second mask design;
   defining a reference region of interest of the first mask design; and
   determining a region of the mask pattern corresponding to the reference region of interest as the group region of interest.

4. The method as claimed in claim 3, wherein defining the reference region of interest includes defining a second region extended from a first region corresponding to the target-ROI in the first mask design and having a same CD as the first region.

5. The method as claimed in claim 1, further comprising simulating forming a target pattern using the mask pattern, wherein determining the group region of interest includes:
overlaying a simulation result image with the mask design,
defining a reference region of interest of the simulation result image, and
determining a region of the mask pattern design corresponding to the reference region of interest as the group region of interest.

6. The method as claimed in claim 5, wherein defining the reference region of interest of the simulation result image includes:
finding a third region corresponding to the target-ROI in the simulation result image;
finding a fourth region extended from the third region and having a same CD as the third region; and
defining the fourth region as the reference region of interest.

7. The method as claimed in claim 6, wherein finding the fourth region includes:
finding critical points in which CDs vary in the third region; and
defining a region connecting the critical points as the fourth region.

8. The method as claimed in claim 7, wherein the critical points are detected using one or more of contrast of a pixel, edge detection, or a slope of an edge.

9. The method as claimed in claim 1, further comprising acquiring a measuring image of a target pattern by forming the target pattern using the mask pattern,
wherein determining the group region of interest includes:
overlaying the measuring image of the target pattern with the mask design;
defining a reference region of interest of the measuring image; and
determining a region of the mask pattern corresponding to the reference region of interest as the group region of interest.

10. The method as claimed in claim 9, wherein the measuring image includes a scanning electron microscope (SEM) image.

11. The method as claimed in claim 1, wherein determining the group region of interest includes:
measuring second CDs of the neighboring blocks adjacent to the target-ROI; and
determining the target-ROI and the neighboring block adjacent to the target-ROI, in which a difference between the first CD and each second CD is not larger than a predetermined critical design gap, as the group region of interest.

12. A method for grouping a region of interest of a mask pattern, comprising:
setting a target region of interest including neighboring blocks having a same critical dimension (CD), in a mask pattern using an optically proximity-corrected (OPC) mask design; and
determining a group region of interest including the target region of interest (target-ROI) and at least one neighboring block adjacent to the target region of interest,
wherein determining the group region of interest includes:
measuring a first CD of the target-ROI;
measuring second CDs of the at least one neighboring block adjacent to the target-ROI;
correcting a measuring value of the first CD using a measuring value of the second CDs, and
determining the target-ROI and the at least one neighboring block adjacent to the target-ROI, in which a difference between the first CD and each second CD is not larger than a predetermined critical design gap, as the group region of interest, and
wherein correcting the measuring value of the first CD includes:
calculating a first mean to target between the measuring value of the first CD and the first CD in the mask design;
calculating second mean to targets between measuring values of the second CDs of the at least one neighboring block of the group region of interest and the second CD of the mask design for each block, respectively; and
correcting the measuring value of the first CD by normalizing the first mean to target and the second mean to target.

13. A method of fabricating a mask used in manufacturing a semiconductor device, comprising:
measuring a critical dimension of a mask pattern, including:
finding a candidate region of interest having a first critical dimension in a field of view (FOV) of a measuring device,
determining a candidate group region of interest including a mask design before optical proximity correction of the mask pattern, and
finding a target group region of interest including a target region of interest by excluding candidate regions of interest having lengths beyond a predetermined region of interest length range;
altering a layout of the mask pattern according to the critical dimension of the mask pattern to provide an altered layout;
fabricating the mask according to the altered layout; and
measuring a first critical dimension (CD) of the target region of interest, including:
measuring second CDs of neighboring blocks in the target region of interest; and
correcting a measuring value of the first CD using measuring values of the second CDs,
wherein correcting the measuring value of the first CD includes:
calculating a first mean to target between the measuring value of the first CD and the first CD in the mask design;
calculating a second mean to target between the measuring values of the second CDs of the neighboring blocks of the target region of interest and the second CD of the mask design for each block, respectively; and
correcting the measuring value of the first CD by normalizing the first mean to target and the second mean to target, and
wherein normalizing the first mean to target and the second mean to target includes calculating an average value of the first mean to target and the second mean to target and calculating a correcting value of the first CD by adding the average value to the first CD in the mask design.

14. The method as claimed in claim 13, wherein the mask pattern includes an optically proximity-corrected mask pattern.

15. The method as claimed in claim 13, wherein finding the target region of interest includes finding the candidate group region of interest, which is most similar to the predetermined region of interest length, as the target region of interest.

* * * * *